US005632001A

United States Patent [19]
Terauchi

[11] Patent Number: 5,632,001
[45] Date of Patent: May 20, 1997

[54] MOBILE COMMUNICATION APPARATUS HAVING RECORDING/REPRODUCING FUNCTION

[75] Inventor: Tohru Terauchi, Amagasaki, Japan

[73] Assignee: Mitsubishi Denki Kabushiki Kaisha, Tokyo, Japan

[21] Appl. No.: 226,090

[22] Filed: Apr. 11, 1994

[30] Foreign Application Priority Data

Sep. 6, 1993 [JP] Japan ................................. 5-221105

[51] Int. Cl.$^6$ ................................................ G10L 9/00
[52] U.S. Cl. ................................. 395/2.1; 395/2.79
[58] Field of Search ............................ 395/2.1; 381/31, 381/36, 29

[56] References Cited

U.S. PATENT DOCUMENTS

| | | | |
|---|---|---|---|
| 4,124,773 | 11/1978 | Elkins | 179/2 |
| 4,737,976 | 4/1988 | Borth et al. | 381/46 |
| 4,772,873 | 9/1988 | Duncan | 381/31 |
| 4,856,066 | 8/1989 | Lemelson | 381/36 |
| 4,905,003 | 2/1990 | Helferich | 381/31 |
| 5,012,411 | 4/1991 | Policastro et al. | 364/413.06 |
| 5,025,486 | 6/1991 | Klughart | 370/95.2 |
| 5,089,820 | 2/1992 | Gorai et al. | 381/29 |
| 5,402,518 | 3/1995 | Lowery | 395/2.1 |

FOREIGN PATENT DOCUMENTS

| | | |
|---|---|---|
| 0502546 | 9/1992 | European Pat. Off. . |
| 2254524 | 10/1992 | United Kingdom . |

*Primary Examiner*—Allen R. MacDonald
*Assistant Examiner*—Vijay B. Chawan
*Attorney, Agent, or Firm*—Rothwell, Figg, Ernst & Kurz

[57] ABSTRACT

A mobile communication apparatus having a recording/reproducing function. The object is to record a greater amount of speech by recording a voice with a reduced amount of memory and to reproduce the recorded signals into original voices, when loading a recording/reproducing function into the mobile communication apparatus. There is provided a recording/reproducing section capable of recording either digital speech signals compressed in a digital speech signal processing section provided in the mobile communication apparatus which digitally performs a communication or compressed digital speech data transmitted from the other party in communication by way of a base station. The thus recorded compressed digital speech data may be supplied into the digital speech signal processing section for the reproduction on the side of the local central office or may be transmitted to the base station for the reproduction on the side of the other party in communication.

15 Claims, 20 Drawing Sheets

MOBILE COMMUNICATION APPARATUS HAVING RECORDING/REPRODUCING FUNCTION

BACKGROUND OF THE INVENTION

1. Field of the Invention

The present invention relates to a mobile communication apparatus capable of recording or reproduction.

2. Description of the Related Arts

FIG. 19 is a block diagram showing a conventional mobile communication apparatus using digital speech signals for communication, for example, a digital portable telephone. In FIG. 1, reference numeral 1 denotes a microphone which supplies speech into the mobile communication apparatus; 2 denotes an A/D converter for converting analog speech signals into digital speech signals: 3 a loudspeaker for performing speech output for the mobile communication apparatus; 4 a D/A converter for converting digital speech signals into analog speech signals; and 5 denotes a digital speech signal processing section for compressing the digital speech signals derived from the A/D converter 2 and for expanding the received compressed digital speech data, which can be, for example, a speech codec. Reference numeral 6 designates a time division multiplex timing control section for timing adjustment which is time division multiplex accessed. Reference numeral 7 signifies a control section for controlling the digital speech signal processing section 5 and the time division multiplex access timing control section 6.

The action thereof will be described hereinbelow. In the diagram, when transmitting a speech data, analog speech signals which have been input in the form of speech through the microphone 1 are converted into digital speech signals by the A/D converter 2. The thus obtained digital signals are supplied into the digital speech signal processing section 5 for signal processing. In the digital speech signal processing section 5, the digital speech signals are compressed to have a lower bit rate. The compressed digital speech data are then output with error correction codes attached thereto. By way of example, the North American digital mobile phone employs as the digital speech signal processing section 5 a speech codec which compresses the digital speech signals to a coding rate in the order of 8 kbps (actually a coding rate is 7.95 kbps and total coding rate is 13 kbps when an error correcting code is added). In the time division multiplex access timing control section 6, the digital speech signals compressed in the digital speech signal processing section under the control of the control section 7 are subjected to the adjustment of timing and supplied with control signals for the formation of multiplexing signals. The multiplexing signals are radio transmitted to a base station. From the base station, speech data is transmitted to the other party in communication by way of a communication network such as a public telephone network.

When receiving the speech data, it is transmitted from the other party in communication through the communication network to the base station which performs processing such as signal compression to form speech signal data (multiplexing signals). In the time division multiplex access timing control section 6, compressed digital speech data are taken out of control signals involved in the multiplexing signals, and then input into the digital speech signal processing section 5. In the digital speech signal processing section 5, signal error correction processing is carried out based on the error correction codes imparted to the compressed digital speech data, and the compressed digital speech data are expanded. In the D/A converter 4, the digital speech signals derived from the digital speech signal processing section 5 are converted into analog speech signals, and output as speech through the loudspeaker 3.

In the case where a recording/reproducing function is loaded into the thus configured portable telephone or the like, for example, where the speech of the other party is recorded and reproduced, the conventional configuration is as shown in FIG. 20. In the diagram, reference numeral 8 denotes a recording/reproducing section for recording speech signals and for reproducing the thus recorded speech signals, which may be comprised of a recording element such as a RAM. Reference numeral 9 denotes a switching section to be connected with the recording/reproducing section 8.

The action thereof will now be described. The received speech data are subjected to expansion processing in the speech signal processing section 5. When performing ordinary communication, SW1 and SW2 of the switching section 90 are both off so that the digital speech signals are output intact to the loudspeaker by way of the D/A converter 4. When recording the voice of the other party during the communication, the control section 7 issues a control signal to the switching section 9. As a result, the SW1 of the switching section 9 is turned on to allow the digital speech signals from the speech signal processing section 5 to be output to the D/A converter 4 and to the recording/reproducing section 8. Afterwards, the recording/reproducing section 9 receives a control signal for starting recording from the control section 7, to initiate the recording of the digital speech signals derived from the digital speech signal processing section 5. When terminating the recording, the control section 7 issues a control signal for ending the recording to the recording/reproducing section 8 to stop the recording and turn the SW1 of the switching section 9 to OFF.

In the case of reproducing the recorded speech signals, the control section 7 issues a control signal to the switching section 9 to turn the SW2 of the switching section 9 to ON. Afterwards, the recording/reproducing section control signal for initiating the reproduction from the control section 7 to output the recorded digital speech signals to the switching section 9. With the SW2 being ON, the digital speech signals supplied into the switching section 9 are converted into analog speech signals by the D/A converter 4 and are output through the loudspeaker 3 in the form of a voice. After the completion of the output of the recorded speech signals, the control section 7 issues a control signal for ending reproducing to the switching section to turn the SW2 of the switching section 9 to OFF to complete the reproduction.

In the case of loading a recording/reproducing function into the mobile communication apparatus such as the conventional portable telephone, if the amount of signals being recorded exceeds the capacity of the recording memory in the recording/reproducing section 8, originally recorded speech signals must be deleted and replaced with new speech signals for recording. The increase of the memory amount in the recording/reproducing section 8 may lead to an increase of the capacity, which may impair the portability of the portable telephone.

SUMMARY OF THE INVENTION

The present invention was conceived in order to overcome the above problems. It is therefore the object of the present invention to ensure a more recording capacity of voice by recording voice with a lower memory capacity, and to reproduce the recorded signals into original voice.

According to a first aspect of the present invention, there is provided a mobile communication apparatus having a recording/reproducing function, comprising an A/D conversion means for converting analog speech signals into digital speech signals; a digital speech signal processing means for compressing the digital speech signals derived from the A/D conversion means and for expanding compressed digital speech data received from a base station; a D/A conversion means for converting the digital speech signals expanded by the speech signal processing means into analog speech signals; a recording/reproducing means connected to the digital speech signal processing means, and intended to record the digital speech signals compressed by the digital speech signal processing means or compressed digital speech data received from the base station and to reproduce the thus recorded compressed digital speech data; and a control means connected to the digital speech signal processing means and the recording/reproducing means, and intended to control the recording or the reproduction by the recording/reproducing means.

According to a second aspect of the present invention, there is provided a mobile communication apparatus having a recording/reproducing function, comprising an A/D conversion means for converting analog speech signals into digital speech signals; a digital speech signal processing means including a speech coding section for compressing digital speech signals derived from the A/D conversion means, an error correction coding section for conferring error correction codes on the digital speech data compressed by the speech coding section, an error correction decoding section for performing an error correction processing for the compressed digital speech data based on the error codes imparted to the compressed digital speech data received from the base station, and a speech decoding section for expanding the compressed digital speech data derived from the error correction decoding section; a D/A conversion means for converting the digital speech signals derived from the speech decoding section into analog speech signals; a recording/reproducing means connected between the voice coding section and the error correction section and between the error correction decoding section and the speech decoding section, and intended to record compressed digital speech signals derived from the speech coding section and the error correction decoding section, and to supply thus recorded compressed digital speech data into the speech decoding section or the error correction decoding section; and a control means connected to the digital speech signal processing means and the recording/reproducing means and intended to control the recording and reproducing in the recording/reproducing means.

According to a third aspect of the present invention, there is provided a mobile communication apparatus having a reproducing function, comprising an A/D conversion means for converting analog speech signals into digital speech signals; a digital speech signal processing means for compressing the digital speech signals derived from the A/D conversion means and for expanding compressed digital speech data received from a base station; a D/A conversion means for converting the digital speech signals expanded by the speech signal processing means into analog speech signals; a reproducing means connected to the digital speech signal processing means, and intended to reproduce compressed digital speech signals having a pattern corresponding to input predetermined signal data, and to output them to the digital speech signal processing means or the base station; a control means connected to the digital speech signal processing means and the reproducing means, and intended to control the reproduction by the reproducing means.

According to a fourth aspect of the present invention, there is provided a mobile communication apparatus having a reproducing function, comprising an A/D conversion means for converting analog speech signals into digital speech signals; a digital speech signals processing means including a speech coding section for compressing digital speech data derived from the A/D conversion means, an error correction coding section for conferring error correction codes on the digital speech data compressed by the speech coding section, an error correction decoding section for performing error correction processing for the compressed digital speech data based on the error codes imparted to the compressed speech signals received from the base station, and a speech decoding section for expanding the compressed digital speech data derived from the error correction decoding section; a D/A conversion means for converting the digital speech signals derived from the speech decoding section into analog speech signals; a reproducing means connected between the speech coding section and the error correction section and between the error correction decoding section and the speech decoding section, and intended to reproduce compressed digital speech signals having a pattern corresponding to input predetermined signal data and to output them to the error correction coding section or the speech decoding section; and a control means connected to the digital speech signal processing means and the recording/ reproducing means and intended to control the recording and reproducing in the recording/reproducing means.

According to a fifth aspect of the present invention, there is provided a mobile communication apparatus having a reproducing function, comprising: an A/D conversion means for converting analog speech signals into digital speech signals; a digital speech signal processing means for compressing the digital speech signals derived from the A/D conversion means and for expanding compressed digital speech data received from a base station; a D/A conversion means for converting the digital speech signals expanded by the speech signal processing means into analog speech signals; and a reproducing means connected to the digital speech signal processing means, and intended to reproduce compressed digital speech signals having a pattern corresponding to predetermined signal data received from a base station, and to output them to the digital speech signal processing means or the base station;

According to a sixth aspect of the present invention, there is provided a mobile communication apparatus having a reproducing function, comprising an A/D conversion means for converting analog speech signals into digital speech signals; a digital speech signal processing means including a speech coding section for compressing digital speech signals derived from the A/D conversion means, an error correction coding section for conferring error correction codes on the digital speech data compressed by the speech coding section, an error correction decoding section for performing error correction processing for the compressed digital speech data based on the error codes imparted to the compressed speech signals received from the base station, and a speech decoding section for expanding the compressed digital speech data derived from the error correction decoding section; a D/A conversion means for converting the digital speech signals derived from the speech decoding section Into analog speech signals; and a reproducing means connected between the speech coding section and the error correction section and between the error correction decoding section and the speech decoding section, and intended to reproduce compressed digital speech signals having a pattern corresponding to predetermined signal data received from a base station and to output them to the error correction coding section or the speech decoding section.

In this manner, the present invention records or reproduces compressed digital speech data to thereby reduce the memory capacity required for recording.

It will be appreciated that the mobile communication apparatus having a recording/reproducing function in accordance with the present invention is applicable to a mobile communication apparatus capable of transmitting and receiving both analog signals and digital signals.

DESCRIPTION OF THE PREFERRED EMBODIMENTS

Embodiment 1

Figure 1:
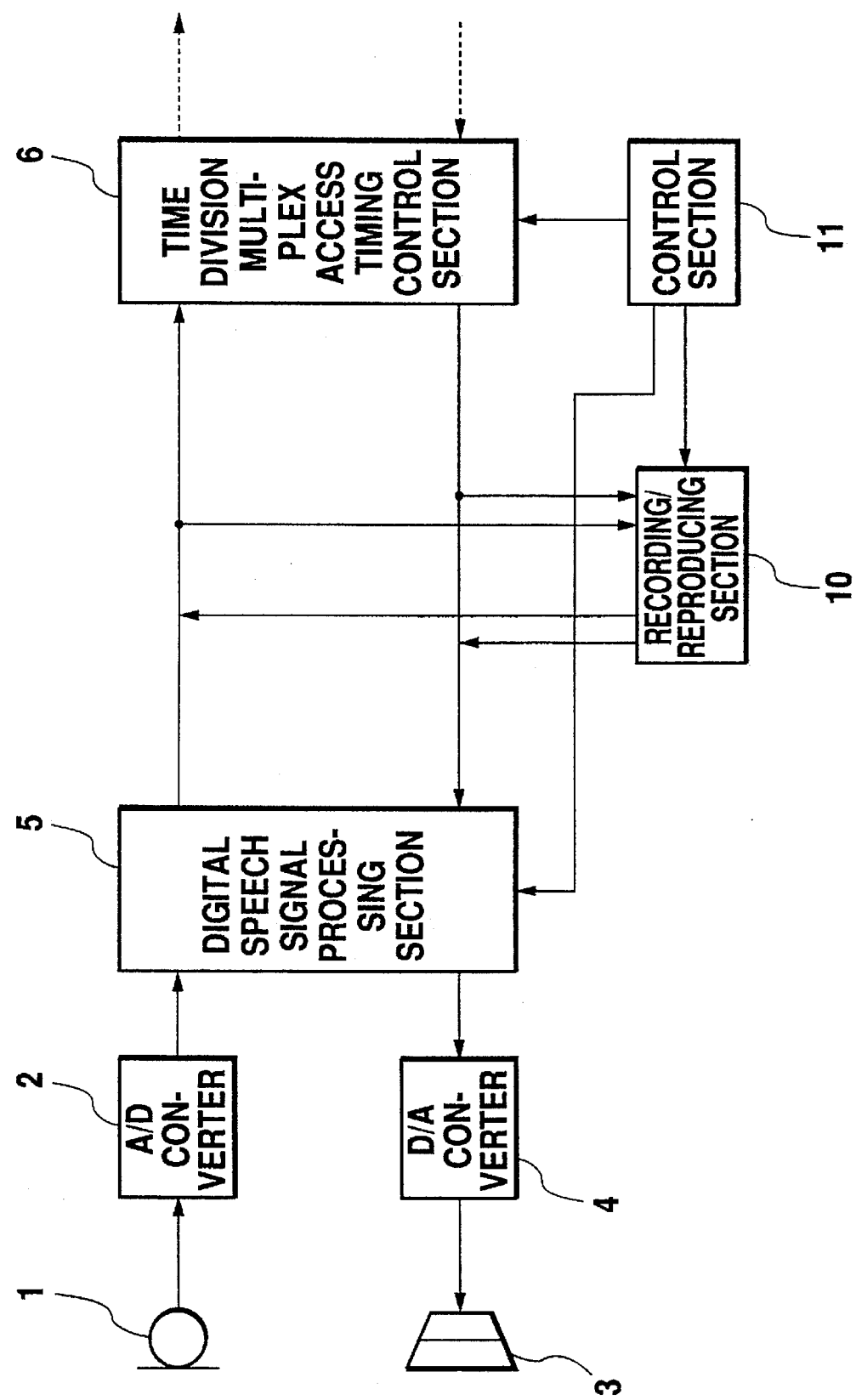
FIG. 1 is a block diagram showing a mobile communication apparatus in accordance with a first embodiment of the present invention.
Figure 19:
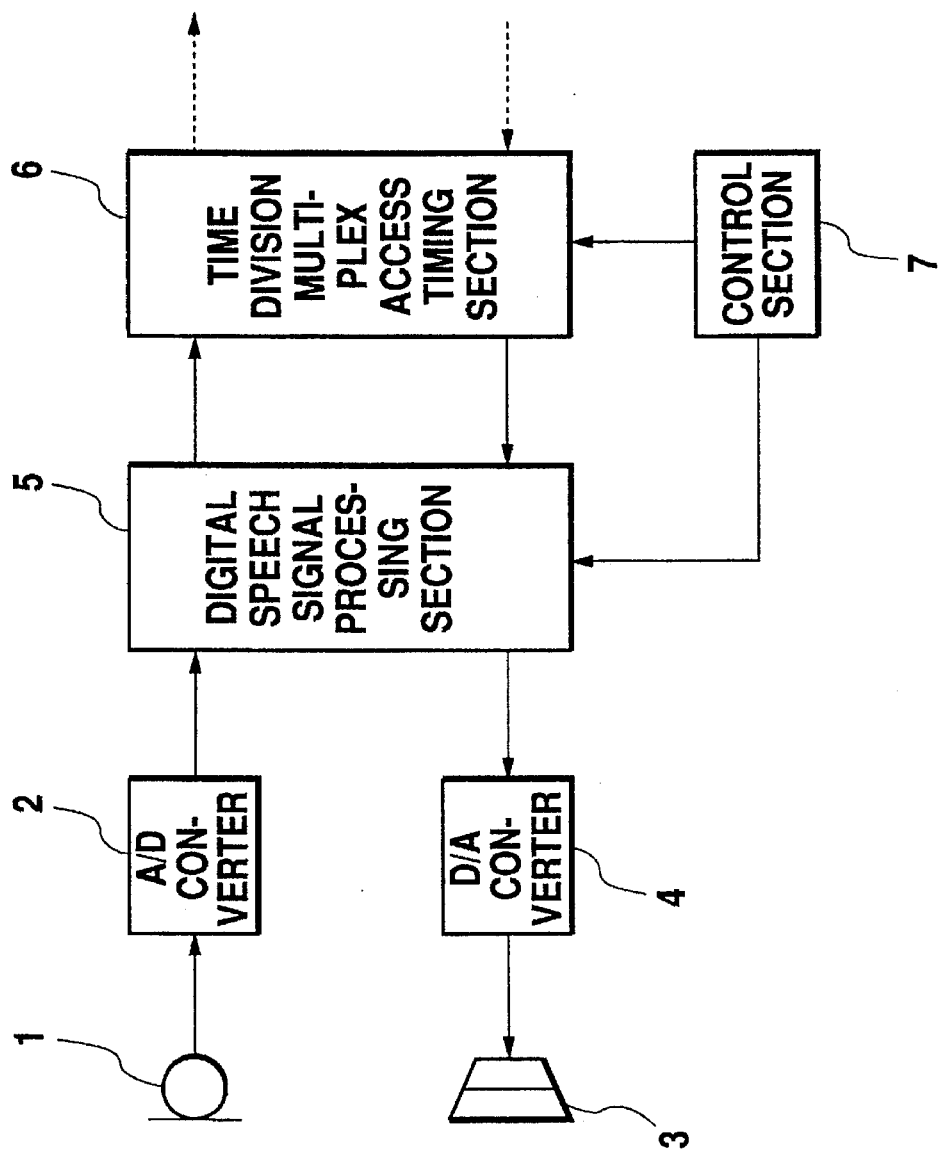
FIG. 19 is a block diagram showing a conventional mobile communication apparatus.
Figure 20:
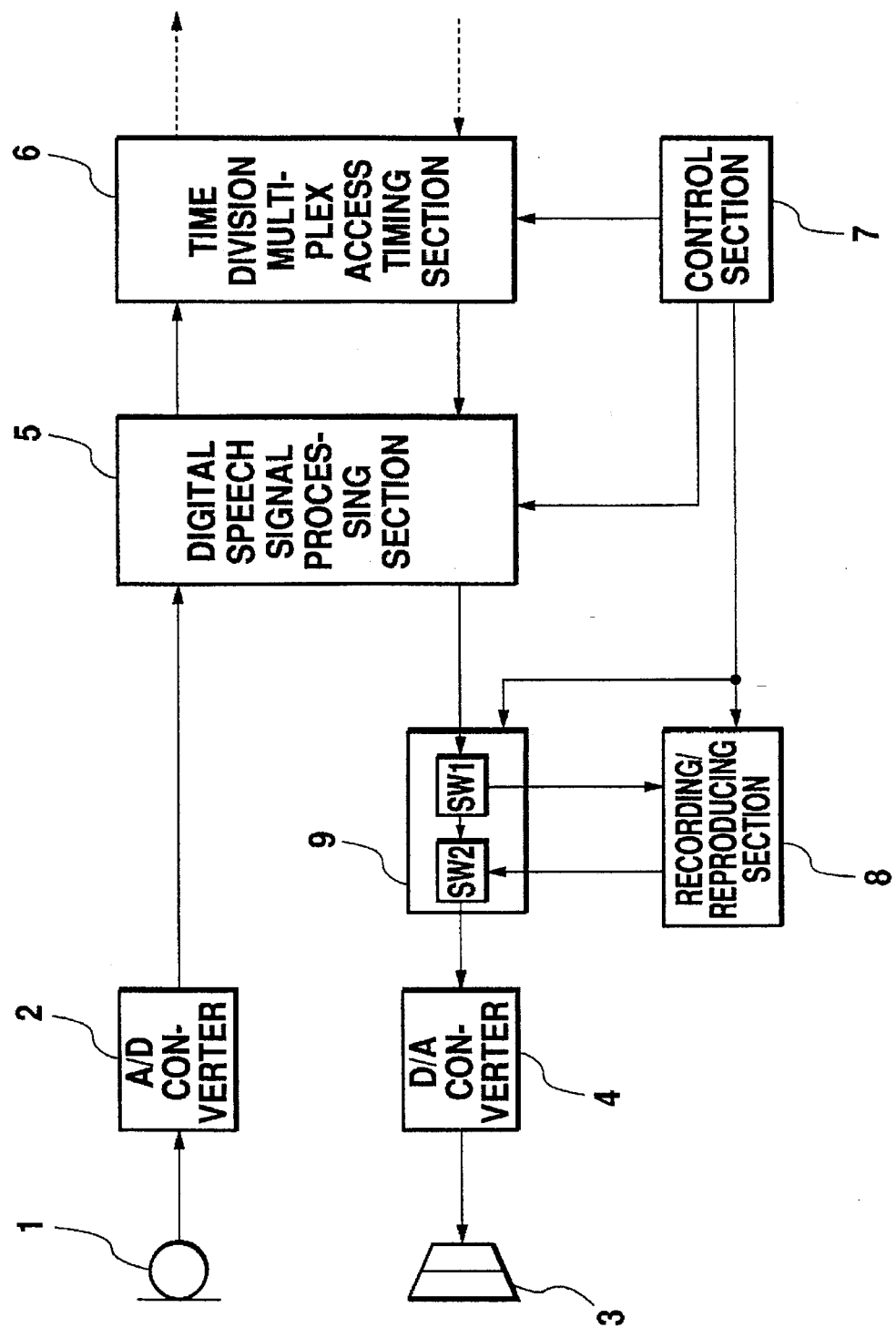
FIG. 20 is a block diagram showing the conventional mobile communication apparatus loaded with a recording/reproducing function.

Referring first to FIG. 1, there is shown a mobile communication apparatus which is a first embodiment of the present invention. Reference numeral 10 denotes a recording/reproducing section for recording compressed digital speech signals and outputting them, which is comprised of a memory element including a RAM. Reference numeral 11 is a control section for controlling the communicating action of the entire apparatus and controlling the recording/reproducing section 10. It is to be noted that since the other constituent elements are the same as the conventional ones shown in FIGS. 19 and 20, they are marked by the same reference numerals and description thereof will be omitted.

Description will now be given of the action. For an ordinary call, the action is very much the same as that shown in the prior art.

In the case of recording speech from the local central office in a calling or communication state (which means, in this case, a state capable of transmitting and receiving a voice), the control section 11 supplies a control signal for starting a recording to the recording/reproducing section 10. Upon receiving the control signal, the recording/reproducing section 10 takes in and records a compressed digital speech signal associated with the local central office which is issued from a time division multiplex access timing control section 6. Afterwards, when terminating the recording, the control section 11 confers a control signal for ending a recording on the recording/reproducing section 10 which in turn stops recording the speech signal in accordance with the control signal. Through the above procedures an ordinary calling state is restored.

In the case of recording speech from the other party, the control section 11 similarly supplies a control signal for starting recording to the recording/reproducing section 10. Upon receiving the control signal, the recording/reproducing section 10 takes in a digital speech data which is compressed by a digital speech signal processing section 5, and records it. Thereafter, when terminating the recording, the control section 11 confers a control signal for ending a recording to the recording/reproducing section 10 to bring the recording to a stop.

In recording a voice from the other party, the voice can be recorded whether it is in or out of communication with the local central office. Signal compression or expansion processing performed by the digital speech signal processing section 5 is available at the time of communication. Therefore, when recording, in particular, a speech signal from the other party in a non-communication state, the control section 11 controls the digital speech signal processing section 5 to execute compression processing for digital speech signals from start to finish of recording in the recording/reproducing section 10.

Description will next be given of the action in the case of reproducing the thus recorded speech on the side of the other party. The control section 11 supplies a control signal for starting reproduction to the recording/reproducing section 10. After receiving the control signal, the recording/reproducing section 10 outputs the recorded compressed digital speech signal to the digital speech signal processing section 5. The digital speech signal processing section 5 expands the compressed digital speech signal into its original digital speech signal, and then supplies it through a D/A converter 4 to a loudspeaker 3.

In this case, the voice can be reproduced on the side of the other party whether in a communication state or a non-communication state. For the reproduction in the non-communication state, however, the control section 11 controls the digital speech signal processing section 5 to execute expansion processing for digital speech signals during the time that the latter outputs the speech signal recorded by the recording/reproducing section 10, in the same manner as above.

Description will now be given of the action in a case where on the side of the local central office there is reproduced the compressed digital speech data recorded in the recording/reproducing section 10. The recorded compressed digital speech signal is supplied to the time division multiplex access timing control section 6, and is then further transmitted to a base station. The thus transmitted compressed digital speech signal is expanded in a digital speech signal processing section which is also typically provided in the base station, so that the voice can be reproduced on the side of the local central office by way of a communication network.

As described above, the voice signal to be recorded In the recording/reproducing section 10 is a compressed digital speech signal. By way of example, the North American digital automobile telephone employs as the digital speech signal processing section 5 a speech coder-decoder or codec capable of compressing the bit rate of a digital speech signal into a lower bit rate of 8 kbps (actually a coding rate is 7.95 kbps and total coding rate is 13 kbps when an error correcting code is added). The recording of the digital speech signal compressed to have a lower bit rate ensures a low bit speech recording, and therefore reduction in the memory amount required for recording. Accordingly, use of the recording element having the same capacity as in the prior art would allow a larger amount of speech to be recorded.

Embodiment 2

Figure 2:
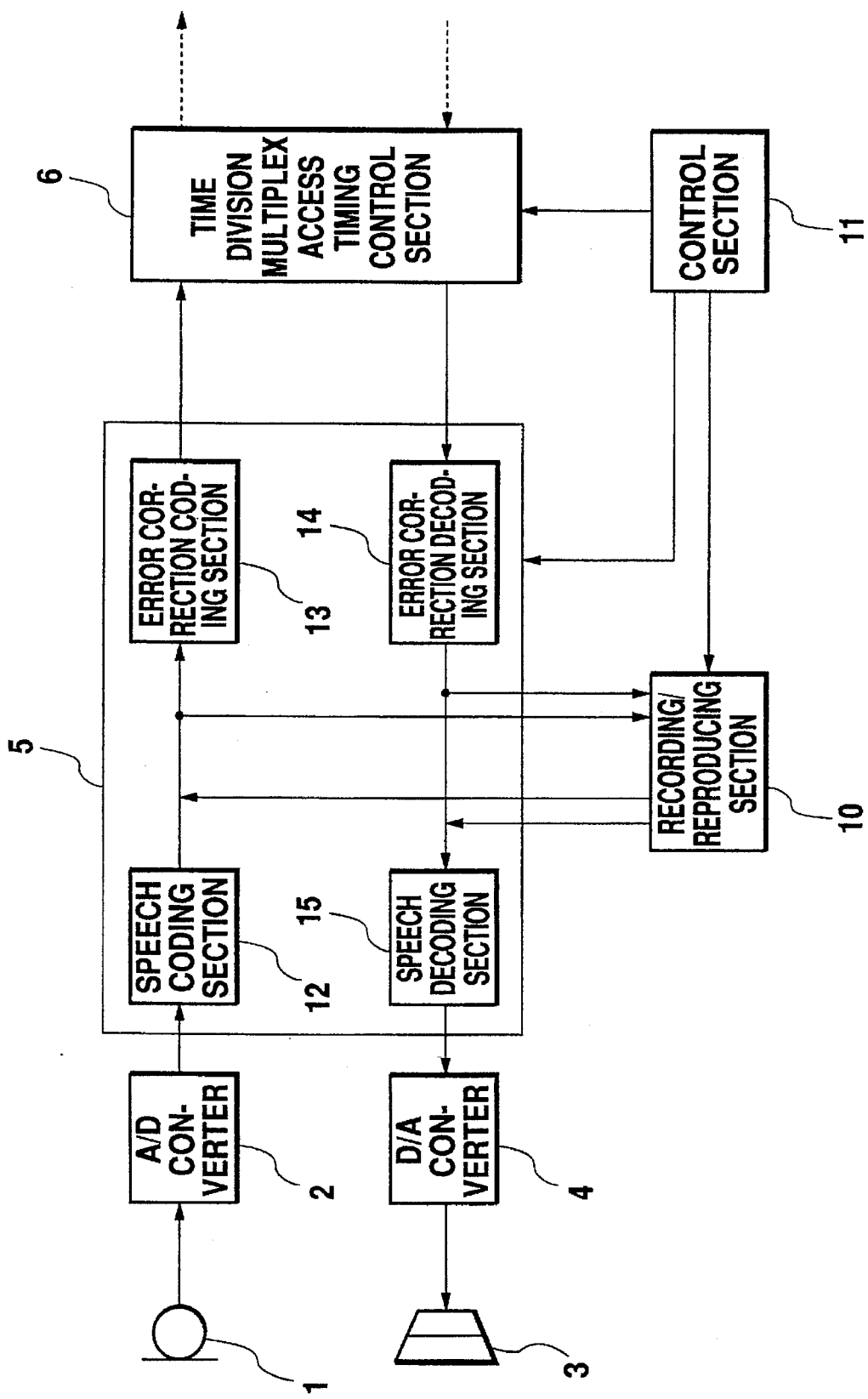
FIG. 2 is a block diagram showing a mobile communication apparatus in accordance with a second embodiment of the present invention.

A digital speech signal processing section 5 is configured as shown in FIG. 2. Reference numeral 12 denotes a speech coding section which inputs a digital speech signal from an A/D converter 2 and compresses its bit rate into a lower one. 13 denotes an error correction coding section which inputs the digital speech signal compressed in the speech coding section 12 and confers an error correcting code on it. The error correction coding section 13 further transmits the compressed digital speech signal with the error correcting code to the base station.

Reference numeral 14 denotes an error correction decoding section which inputs the compressed digital speech data with the error correcting code transmitted from the base station at the time of reception, and corrects, based on the error correcting code, bit errors within the digital speech data which may occur in a wireless transmission path when transmitting the speech data. Reference numeral 15 is a speech decoding section which inputs only the compressed digital speech data which have been subjected to the error correction processing in the error correction decoding section 14, and expands their bit rates into original ones.

In the case of loading a recording/reproducing function into a mobile communication apparatus having the thus configured digital signal processing section 5, the recording/reproducing section 10 in the first embodiment may be so constructed as to record and reproduce only the compressed digital speech signals as shown In FIG. 2.

The action thereof will now be described. When recording speech from the local central office, the recording/reproducing section 10 records the compressed digital speech data subjected to the error correction processing in the error correction decoding section 13. When recording speech on the side of the other party, there are recorded compressed digital speech data derived from the speech coding section 10.

On the contrary, when the thus recorded compressed digital speech signals are reproduced on the side of the other party, the compressed digital speech data output from the recording/reproducing section 10 are supplied into the speech decoding section 15. In the case of reproduction on the side the local central office, the compressed digital speech data issued in the same manner are input into the error correction coding section 13, and are then marked with an error correcting code for the transmission to the base station. After the error correction processing and expansion processing for the speech signal In the base station, the thus processed speech signals are transmitted to the local central office for reproduction of speech. As described in the first embodiment, when recording the speech from the other party in the non-communication state, the signals are compressed in the speech coding section 12. Further, when reproducing on the side of the other party in the non-communication state, the control section 11 controls the digital speech signal processing section 5 to allow the speech decoding section 15 to execute expansion processing for the signals.

Since, as described above, only the compressed digital speech signals without the error correcting codes are recorded in the recording/reproducing section 10, the number of bits for recording may be decreased further than the case where the speech signals to be input or output with respect to the digital speech signal processing section 5 are recorded in the recording/reproducing section 10 as shown in the first embodiment.

Embodiment 3

Figure 3:
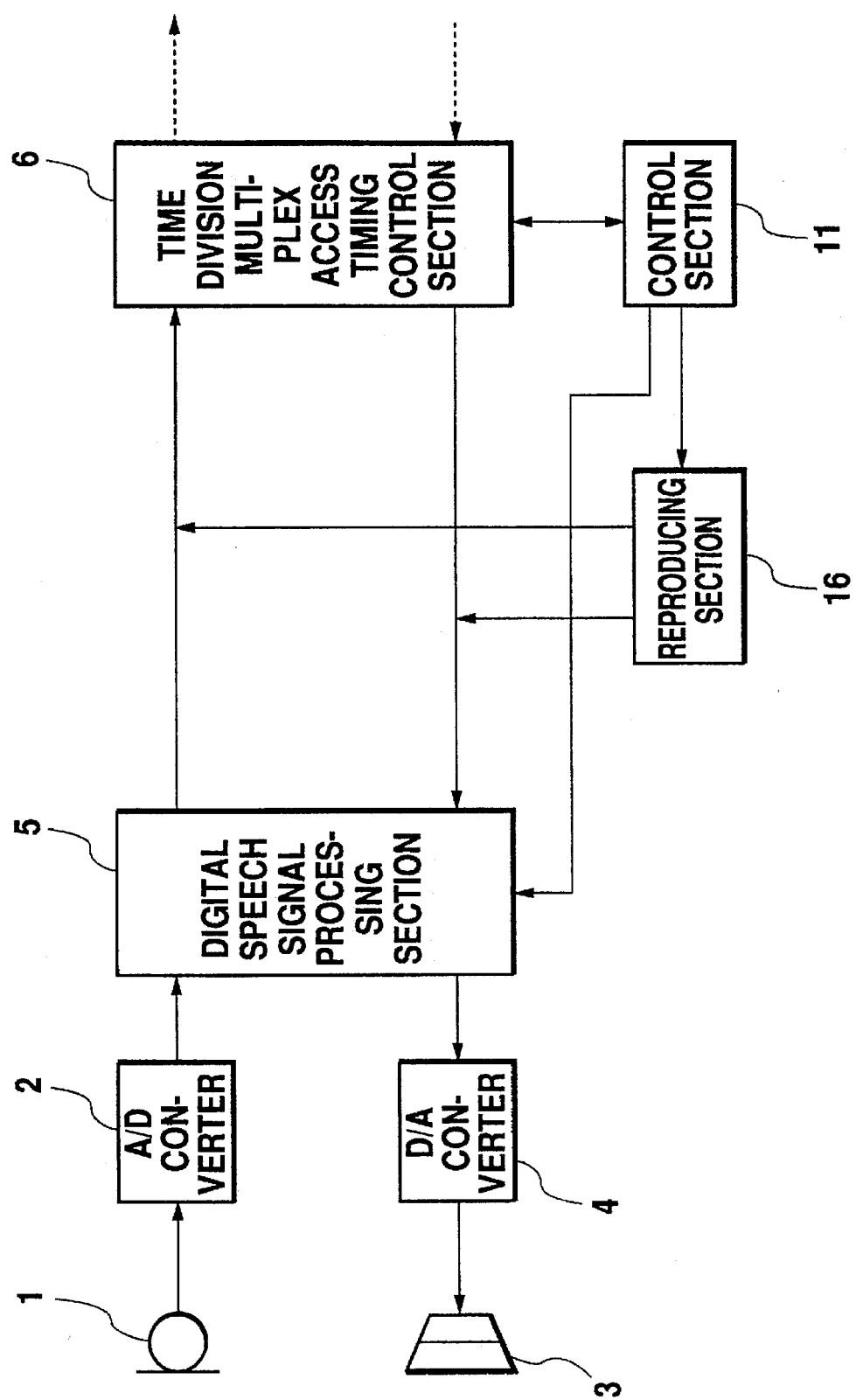
FIG. 3 is a block diagram showing a mobile communication apparatus in accordance with a third embodiment of the present invention.

Referring next to FIG. 3, there is shown a third embodiment of the present invention. In FIG. 3, reference numeral 3 denotes a reproducing section which inputs predetermined signals and outputs compressed digital data signals corresponding thereto, and which is comprised of a memory element including a ROM. It is to be appreciated that the other constituent elements are the same as the conventional ones shown in FIGS. 19 and 20, and hence are designated by the same reference numerals, of which description will be omitted (the same applies to other embodiments described hereinbelow).

The action thereof will now be described. Certain digital speech signals are previously recorded in the reproducing section 16 in the form of digital speech signals compressed by the same coding rates as those for the digital speech signals compressed In the digital speech processing section 5 at the time of calling. The control section 11 supplies predetermined signal data into the reproducing section 16 which in turn outputs digital speech signals corresponding to the signal data. The compressed digital speech signals derived from the reproducing section 16 are input into the digital speech signal processing section 5 and expanded. The thus expanded digital speech signals are converted in a D/A converter 4 into analog speech signals and output to the loudspeaker 3 for the reproduction of the voice.

By way of example, a function key on the apparatus associated with the local central office is operated to output certain data from the loudspeaker associated with the local central office. For example, there may be envisaged a typing operation whereby a moment of time is indicated by a voice through the operation of the function key. When depressing the function key, signals are supplied to the control section 11 which in turn outputs data signals indicating the current time to the reproducing section 16 in response to the signals. The reproducing section 16 stores in advance compressed digital speech signals indicating the current time corresponding to the signal data to be input, and outputs the compressed digital speech data by receiving the signal data from the control section 11. Then, the loudspeaker associated with the local central office informs the user of the current time through a voice.

Alternatively, the compressed digital speech signals to be output from the reproducing section 16 may be transmitted to the base station, and reproduced on the side of the other party in communication. In the case of transmitting a message to the other party on an answering machine, for example, call-in signals are first transmitted from the other party and are supplied into the control section 11. Providing the side of the local central office is absent, the control section 11 transmits the signal data on a message transmission to the reproducing section 16 after sending out a plurality of calls to the local central office. The reproducing section 16 records speech signals for the message corresponding to the signal data in the form of compressed digital speech signals, and transmits them to the base station. The base station executes processing for expanding the compressed digital speech data, and then sends out speech to the other party in communication. Upon receiving them, the other party reproduces the speech such as, for example, "We are away now" represented by the compressed digital speech signals.

As described hereinabove, the compressed digital speech signals previously stored within the reproducing section 16 are expanded for reproduction with the aid of the digital speech signal processing section 5 so that a smaller memory amount of speech signals are to be recorded.

Embodiment 4

Figure 4:
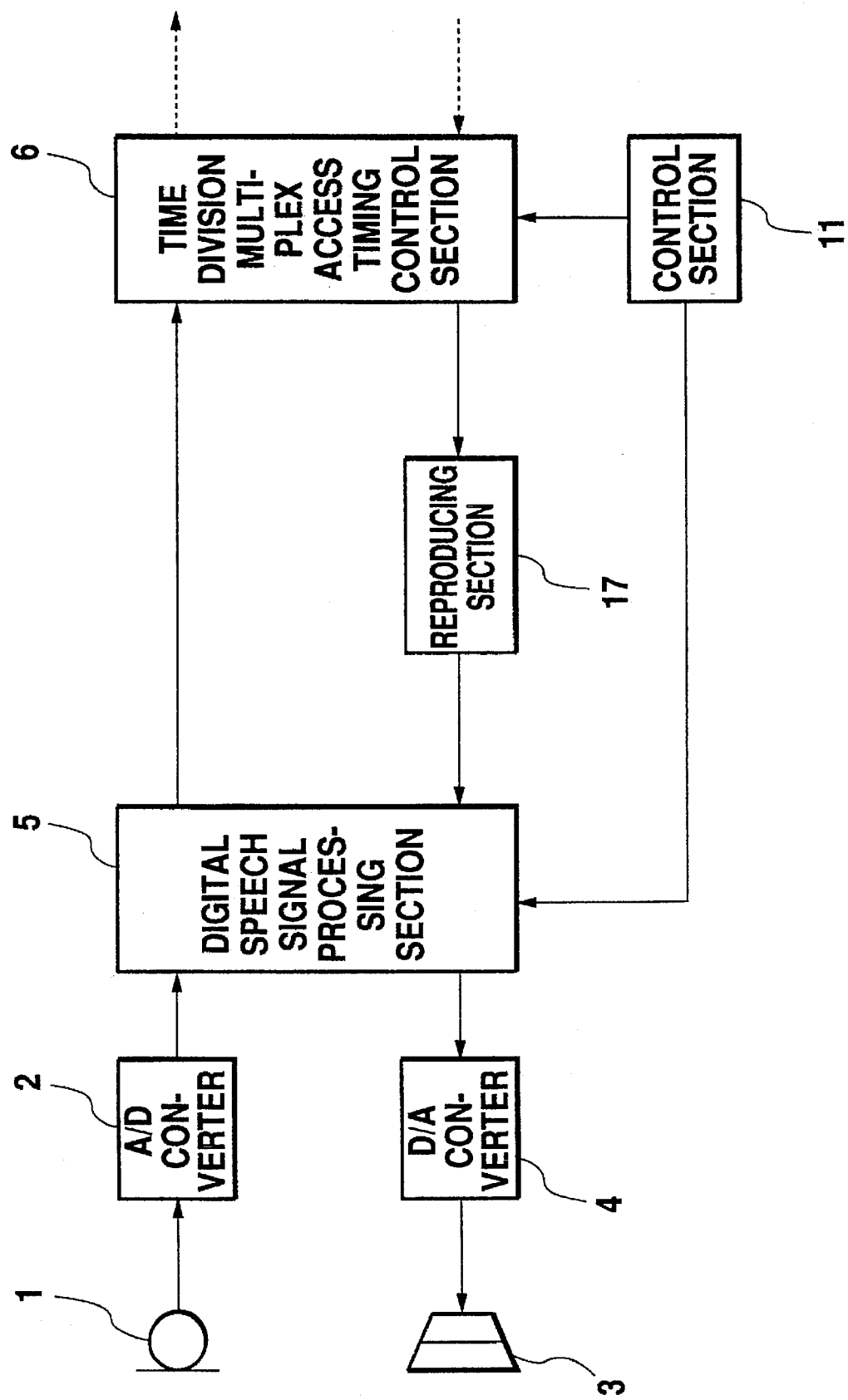
FIG. 4 is a block diagram showing a mobile communication apparatus in accordance with a fourth embodiment of the present invention.

In the third embodiment, there is provided the reproducing section for outputting compressed digital speech data corresponding to the predetermined signal data. In the case of sending out speech such as an answering message to the other party as described above, the predetermined signals may be transmitted from the calling party, and directly supplied into the reproducing section provided on the side of the called party so as to allow the compressed digital speech data corresponding to the signal data to be outputted. FIG. 4 illustrates its configuration. In FIG. 4, reference numeral 17 is a reproducing section which reproduces compressed digital speech signals corresponding to the predetermined signal data transmitted by the calling party by way of the base station.

In the case, for example, where the other party is absent and an answering message sent out from the other party is reproduced, the base station first receives signal data representing the answering massage from the other part. The base station imparts its signal data to multiplexing signals to be formed, and transmits them to the local central office which in turn takes out the thus transmitted signal data from the multiplexing signals in the time division multiplex access timing control section 6 and supplies them into the reproducing section 17. The reproducing section 17 stores in advance speech signals (or an answering message) corresponding to the signal data in the form of compressed digital speech data. Upon receiving the signal data, the reproducing section 17 supplies the compressed digital speech signals corresponding to the thus received signal data into the digital speech signal processing section 5. After the expansion processing for signals in the digital speech signal processing section 5, the answering message can be reproduced through the loudspeaker 3 by way of the D/A converter 4.

It is to be noted that when performing an ordinary call, in other words, when outputting compressed digital speech data at the time of call from the time division multiplex access timing control section 6, the compressed digital speech signals supplied into the reproducing section 17 are allowed to pass therethrough intact, and are input into the digital speech signal processing section 5. Afterwards, the call is performed by the same action as in the prior art.

Embodiment 5

Figure 5:
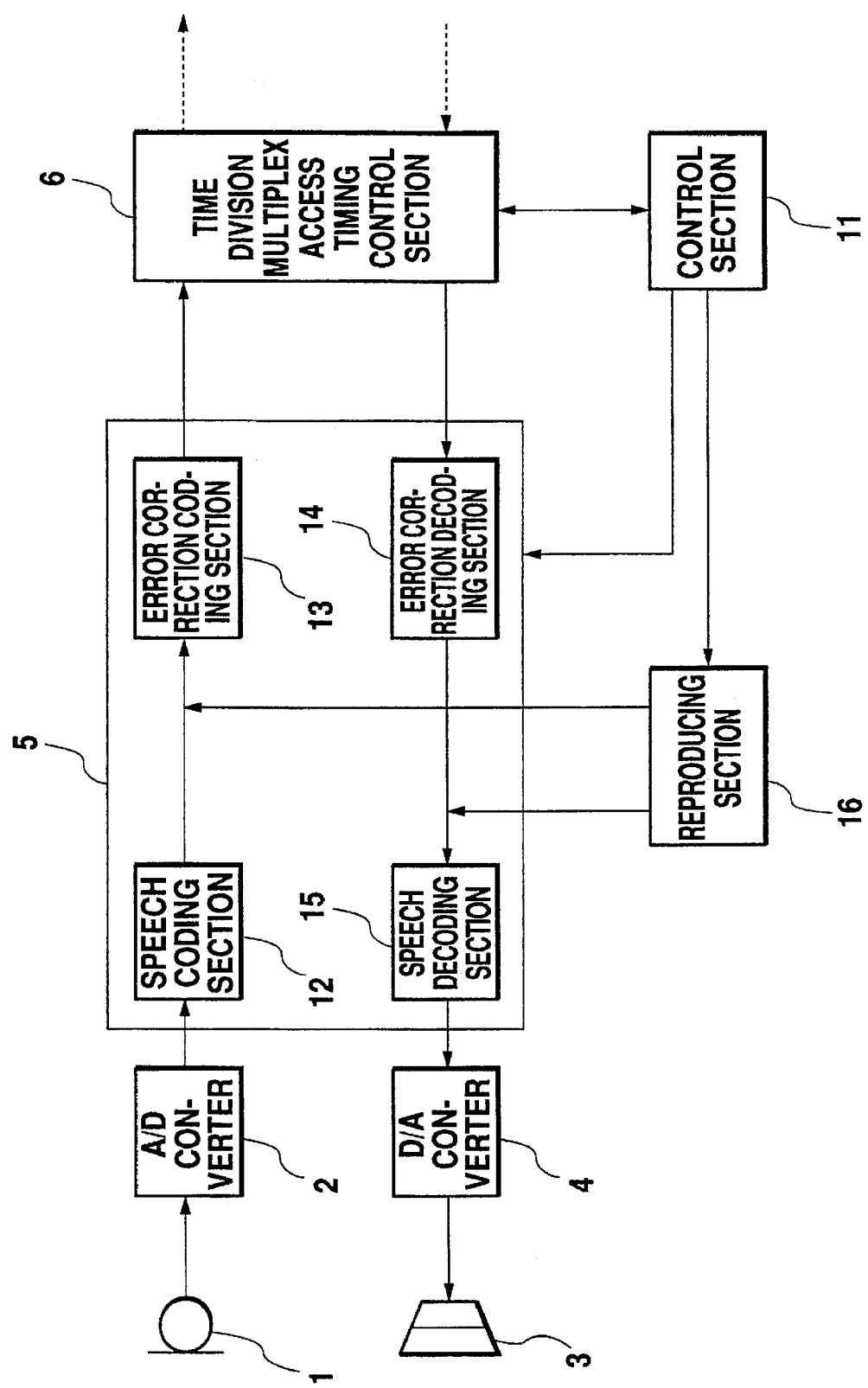
FIG. 5 is a block diagram showing a mobile communication apparatus in accordance with a fifth embodiment of the present invention.

In the third embodiment, the compressed digital speech signals derived from the reproducing section 16 are either input into the digital speech signal processing section 5, or transmitted to the other party in communication. However, the reproducing section 16 in the third embodiment may be configured as shown in FIG. 5, in the case where the digital speech signal processing section 5 includes the speech coding section 12, the error correction coding section 13, the error correction decoding section 14, and the speech decoding section 15 as described in the second embodiment.

Where speech is output on the side of the local central office, the compressed digital speech data derived from the reproducing section 16 are input into the speech decoding section 15 in which the compressed digital speech signals are subjected to the expansion processing and supplied into the loudspeaker 3 by way of the D/A converter 4. On the contrary, where the voice is output on the side of the other party, the compressed digital speech data issued from the reproducing section 16 are supplied into the error correction coding section 13 in which the compressed digital speech data are marked with error correction codes for the transmission to the base station.

Figure 6:
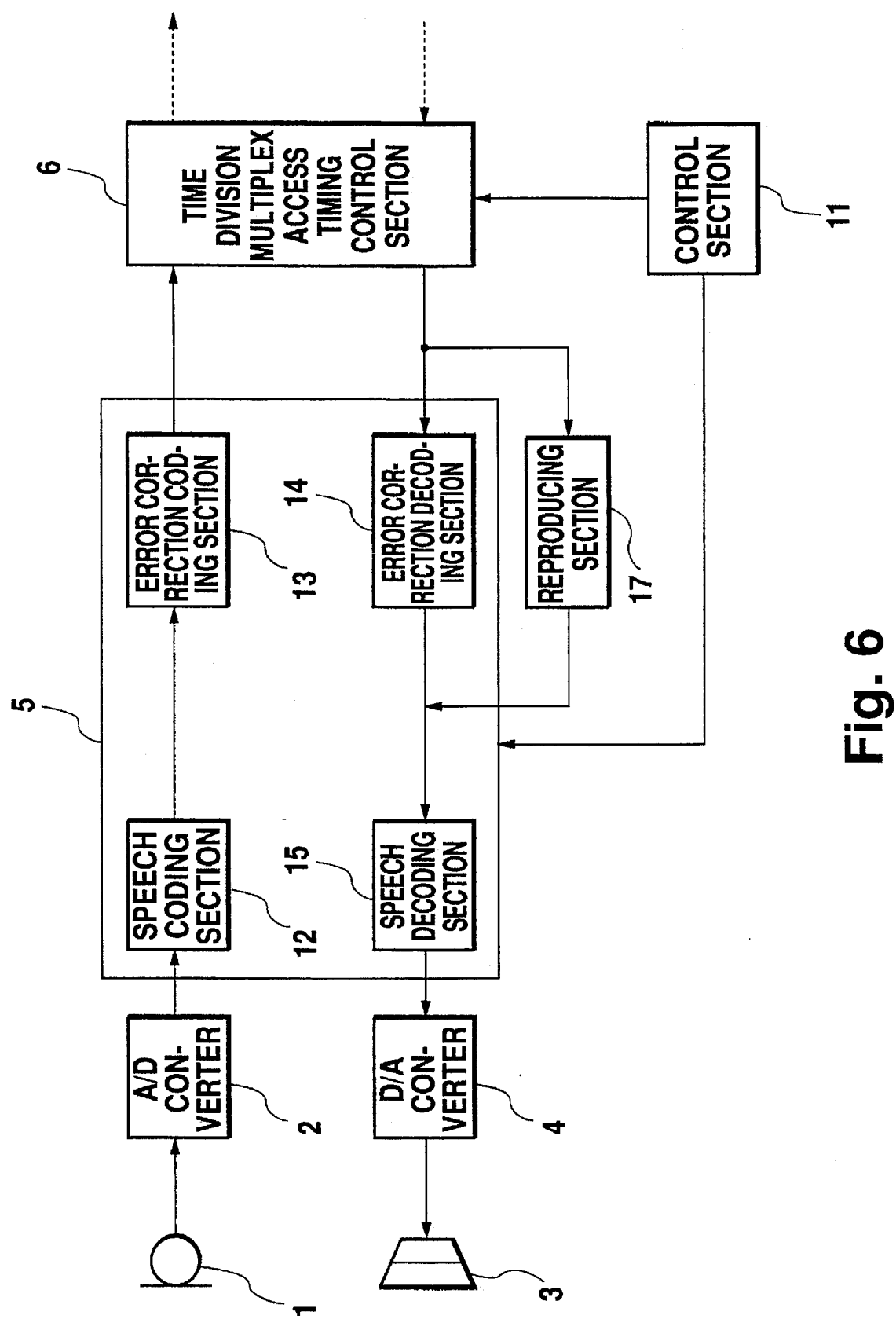
FIG. 6 is a block diagram showing a mobile communication apparatus in accordance with a fifth embodiment of the present invention, but differing from that shown in FIG. 5.

Further, there may be provided the reproducing section 17 in the fourth embodiment. FIG. 6 illustrates its configuration. The reproducing section 17 outputs compressed digital speech data corresponding to signal data representing an answering message transmitted from the other party in communication by way of the base station. Thus output compressed digital speech data are directly input into the speech decoding section 15 within the digital speech signal processing section 5, and are reproduced on the side of the local central office.

Embodiment 6

Figure 7:
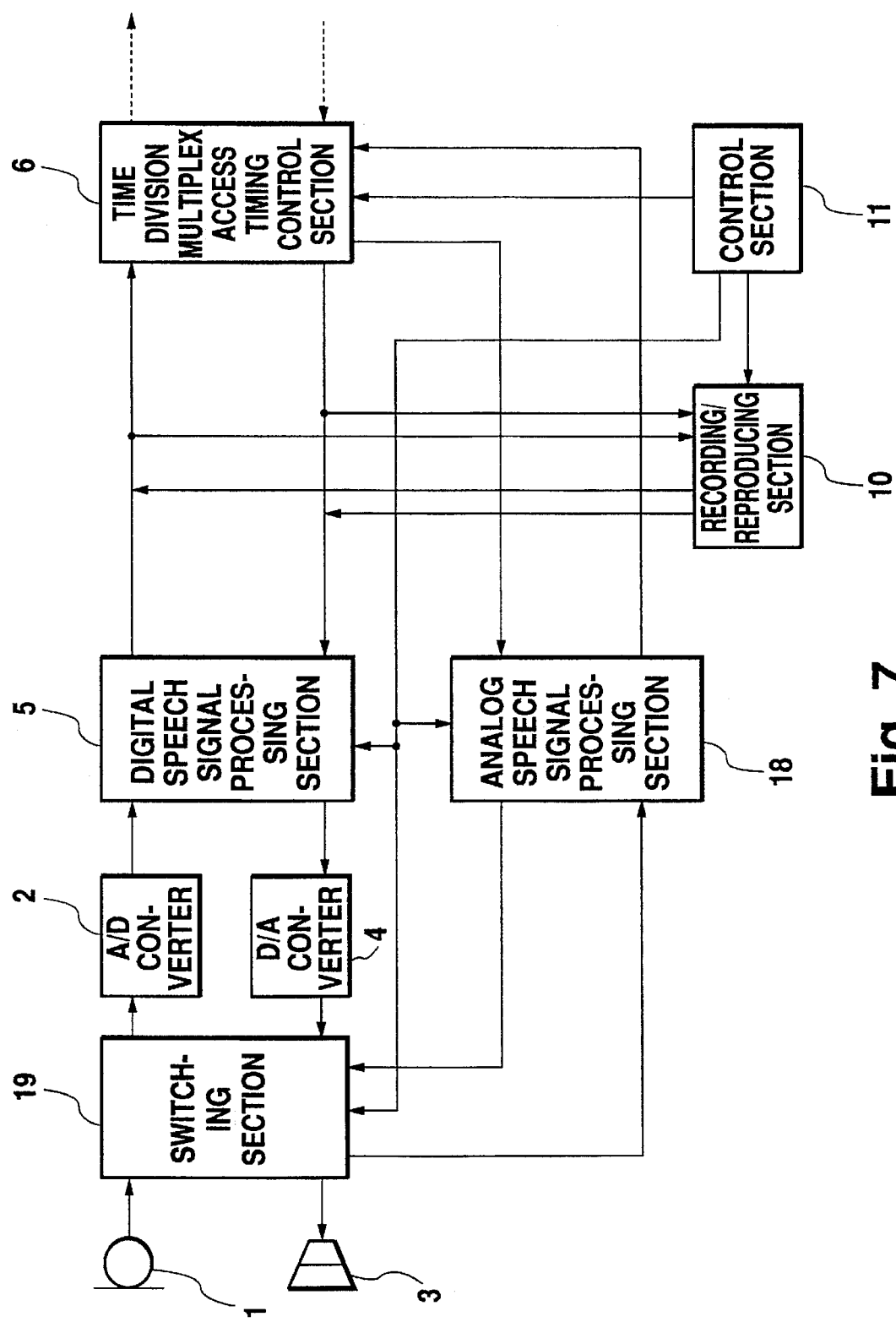
FIG. 7 is a block diagram showing a mobile communication apparatus in accordance with a sixth embodiment of the present invention.

FIG. 7 depicts a mobile communication apparatus capable of both digital communication and analog communication in the radio communication zone between the local central office and the base station. Reference numeral 18 denotes an analog speech signal processing section which performs signal processing for an ordinary analog speech including voice band filtering, and speech compression/expansion in the mobile communication apparatus for analog communication. Reference numeral 19 denotes a switching control section which selects either a digital communication mode or an analog communication mode.

The control section 11 determines which mode is to be utilized out of the digital communication or the analog communication. Based on the decision, the control section 11 switchably inputs or outputs the speech signals in such a manner that, if in digital communication mode, then the digital speech signal processing section 5 performs the speech signal processing, while, if in analog communication mode, the analog speech signal processing section 18 executes the speech signal processing.

In the mobile communication apparatus for both the digital communication and analog communication as described above, when loading a recording/reproducing function thereinto, the illustrated recording/reproducing section 10 records the compressed digital speech data to be input or output with respect to the digital speech signals processing section 5, and outputs the thus recorded signals. The recording/reproducing section 10 is the same as in the first embodiment, which records speech of the other party in communication or speech on the side of the local central office in the form of compressed digital speech data, and reproduces the thus recorded compressed digital speech data on the side of the other party or of the local central office.

Description will now be given of a case of selecting the digital communication mode. The control section 11, if it determines the digital communication mode, issues control signals for selecting the digital communication mode to the switching control section 19. When transmitting speech, the switching control section 19 transmits the analog speech signals derived from the microphone 1 to the A/D converter 2 based on the control signals from the control section 11, and the resultant digital speech signals to be output are subjected to the compression processing for the speech signals in the digital speech signal processing section 5. The thus compressed digital speech signals are transmitted to the base station by way of the time division multiplex access timing control section 6. On the contrary, when receiving speech from the base station, the compressed digital speech data which have been processed in the time division multiplex timing control section 6 based on the decision of the digital communication mode are supplied into the digital speech signals processing section 5 for expansion processing. Thereafter, the thus expanded digital speech signals are supplied into the loudspeaker 3 by way of the D/A converter 4 and the switching control section 19. During the digital communication mode, the analog speech signal processing section 18 is not available.

When selecting this digital communication mode, the recording/reproducing section 10 records the speech of the other party in communication or the speech on the side of the local central office in the form of compressed digital speech signals. The action for reproducing the compressed digital speech signals being thus recorded on the side of the other party or of the local central office will be the same as the recording/reproducing action in the first embodiment.

Description will now be given of the action in a case of selecting the analog communication mode. The control section 11 determines the analog communication mode and sends out a control signal for selecting the analog communication mode to the switching control section 19. Based on the control signal received from the control section 11, the switching control section 19, when transmitting speech data, transmits the analog speech signals derived from the microphone 1 to the analog speech signal processing section 18 to execute ordinary analog speech signal processing. The thus signal-processed analog speech signals are supplied into the time division multiplex access timing control section 6 for transmission to the base station. On the contrary, when receiving speech data from the base station, the analog speech signals which have been processed in the time division multiplex access timing control section 6 based on the analog communication mode determined by the control section 1 are input into the analog speech signal processing section 18 for the execution of ordinary analog speech signal processing. Afterwards, the analog speech signals subjected to the signal processing are input into the switching control section 19 and supplied directly to the loudspeaker 3. During the selection of the analog communication mode, the digital speech signal processing section 5 is not available.

When recording the speech signals of the local central office during the selection of the analog communication mode, the control section 11 transmits a control signal for starting recording to the recording/reproducing section 10, and sends out a control signal to the digital speech signal processing section 5. Based on the control signal, the switching control section 19 supplies the analog speech signals to the A/D converter 2 for the conversion into the digital speech signals, and inputs them into the digital speech signal processing section 5. The digital speech signal processing section 5 performs compression processing for the input digital speech signals, based on the control signal derived from the control section 11. The compressed digital speech data to be output are recorded in the recording/reproducing section 10. When terminating the recording, the control section issues a control signal to the recording/reproducing section 10, the switching control section 19, and the digital speech signal processing section 5. Thus, the recording/reproducing section 10 stops recording, and the switching control section 19 and the digital speech signal processing section 5 are restored to the pre-recording state.

In the case of recording a speech signal on the side of the other part upon the selection of the analog communication mode, the control section 11 issues a control signal for starting recording to the recording/reproducing section, and sends out a control signal to the switching control section 19 and the digital speech signal processing section 5. The switching control section 19 supplies the analog speech signal subjected to the signal processing in the analog speech signal processing section 18 based on the control signal into the loudspeaker 3 as well as the A/D converter 2. The speech signals digitized by the A/D converter 2 are transmitted to the digital speech signal processing section 5. Based on the control signals from the control section, the digital speech signal processing section 5 which has been hitherto out of operation performs compression processing for the digital speech signals, and the recording/reproducing section 10 records the digital speech data compressed in the digital speech signal processing section 5. When terminating the recording, the control section 11 sends out a control signal to the recording/reproducing section 10, the switching control section 19, and the digital speech signal processing section 5. Thus, the recording/reproducing section 10 stops the recording operation, and the switching control section 19 and the digital speech signal processing section 5 are recovered to the state prior to recording.

When the compressed digital speech signals being recorded in the recording/reproducing section 10 are required to be reproduced on the side of the other party during the selection of the analog communication mode, the control section 11 issues a control signal for starting reproducing to the recording/reproducing section 10, and issues a control signal to the switching control section 19 and the digital speech signal processing section 5. The compressed digital speech signals being recorded in the recording/ reproducing section 10 are supplied into the digital speech signal processing section 5. In response to the control signal originating from the control section 11, the digital speech signal processing section 5 initiates expansion processing for the input compressed digital speech data. The thus expanded digital speech signals are converted into the analog speech signals by the D/A converter 4, and supplied into the switching control section 19. The switching control section 19, In response to the control signal from the control section 11, sends out the input analog speech signals to the analog speech signal processing section 18. The analog speech signals subjected to the signal processing are transmitted through the time division multiplex access timing section 6 to the base station, and further transmitted to the other part in communication for reproduction. After the completion of output of speech signals recorded in the recording/reproducing section 10, the control section 11 issues a control signal to the switching control section 19 and the digital speech signal processing section 5 which are restored to their pre-reproducing states.

In the case of reproducing the compressed digital speech signals being recorded at the time selection of the analog communication mode, the control section 11 issues a control signal for starting reproducing to the recording/reproducing section 10, and issues a control signal to the switching control section 19 and the digital speech signal processing section 5. In the same manner as above, the compressed digital speech data being stored in the recording/reproducing section 10 are transmitted to the digital speech signal processing section 5 for expansion processing. The thus expanded digital speech signals are converted into the analog speech signals by the D/A converter 4, and supplied into the switching control section 19. In response to the control signal originating from the control section 11, the switching control section 19 supplies the analog speech signals to the loudspeaker. After the completion of the output of the speech signals being recorded, the control section 11 issues a control signal to the switching control section 19 and the digital speech signal processing section 5 which are in turn recovered in their pre-reproduction state.

When loading a recording/reproducing function into the mobile communication apparatus for both the digital and analog communications as described above, the memory amount required for the recording can be reduced by utilizing the digital speech signal processing section 5 to record the compressed digital speech signals.

Embodiment 7

Figure 8:
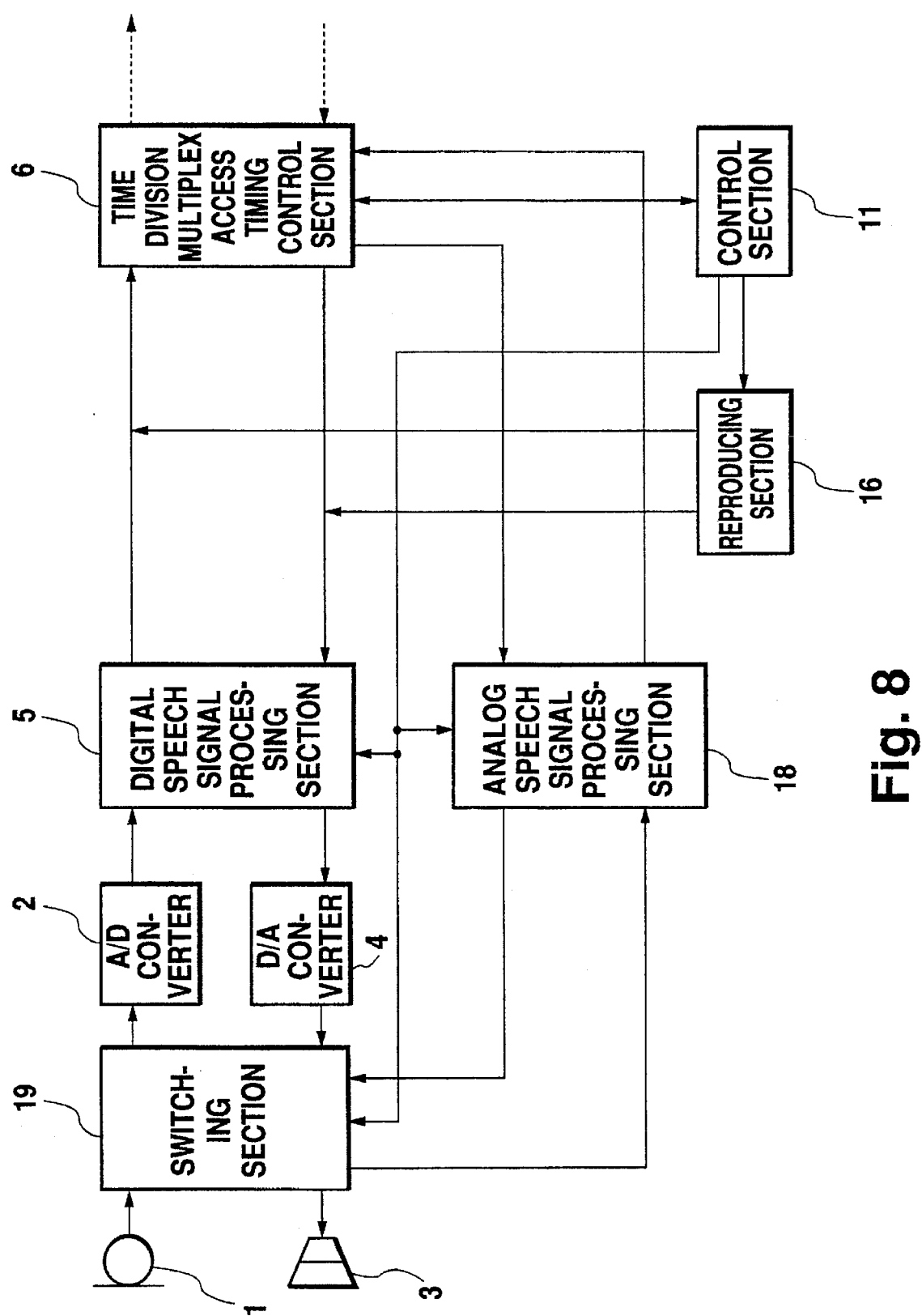
FIG. 8 is a block diagram showing a mobile communication apparatus in accordance with a seventh embodiment of the present invention.

In lieu of the recording/reproducing section loaded into the mobile communication apparatus for both digital and analog communications as shown in the sixth embodiment, there may be employed the reproducing section 16 shown in the third embodiment. FIG. 8 depicts its configuration. The reproducing section 16 supplies compressed digital speech data corresponding to the predetermined signal data into the digital speech signal processing section 5 for the reproduction on the side of the local central office, or alternatively, into the time division multiplex access timing control section 6 for the reproduction on the side of the other party through the base station.

Figure 9:
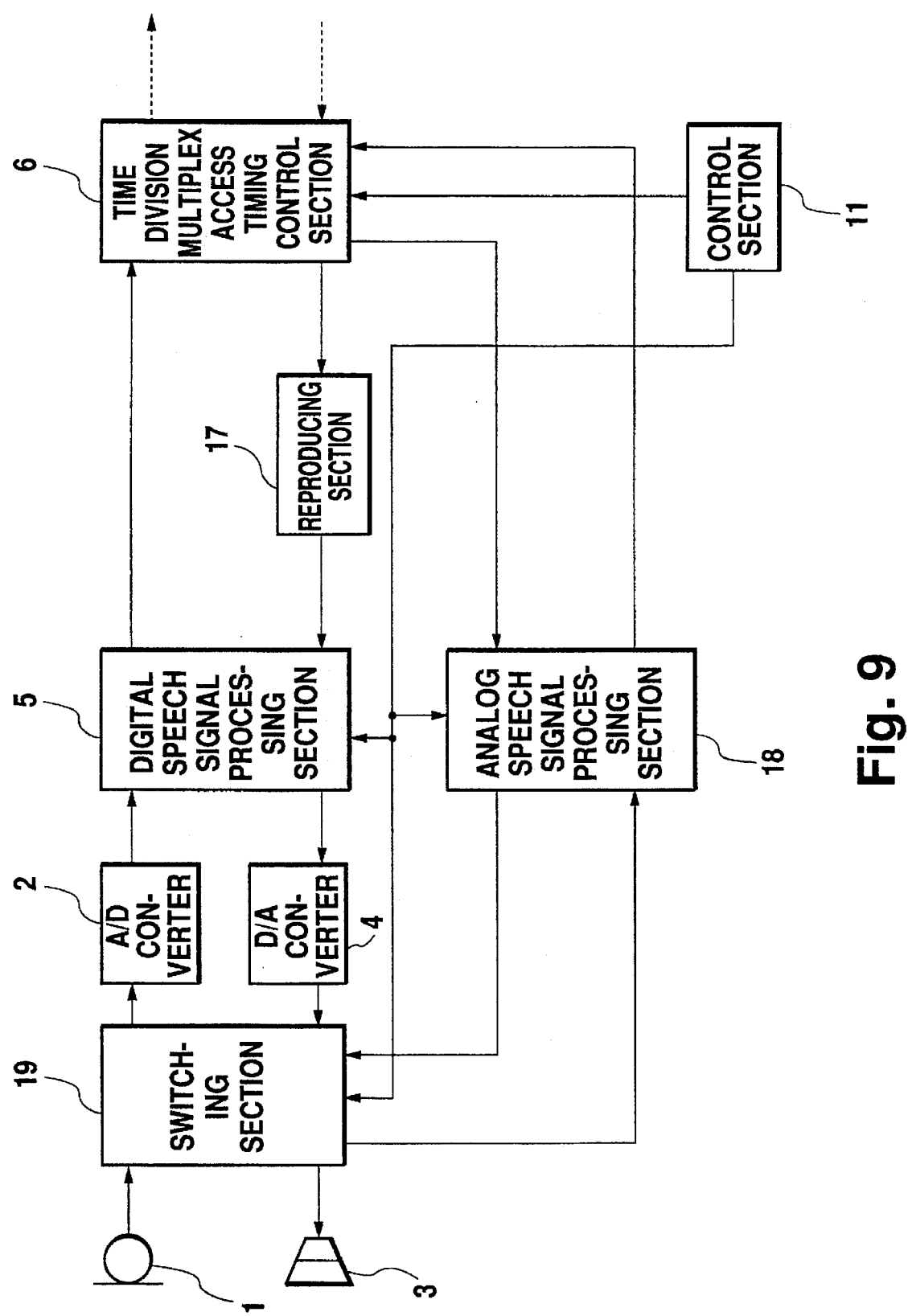
FIG. 9 is a block diagram showing a mobile communication apparatus in accordance with a seventh embodiment of the present invention, but differing from that shown in FIG. 8.

Instead of the recording/reproducing section 10 loaded into the mobile communication apparatus for both the digital and analog communications as shown in the sixth embodiment, there may be employed the reproducing section 17 as shown in the fourth embodiment. FIG. 9 depicts its configuration. The reproducing section 17 supplies the compressed digital speech data corresponding to the predetermined signal data into the digital speech signal processing section 5 for the reproduction on the side of the local central office.

Embodiment 8

Figure 10:
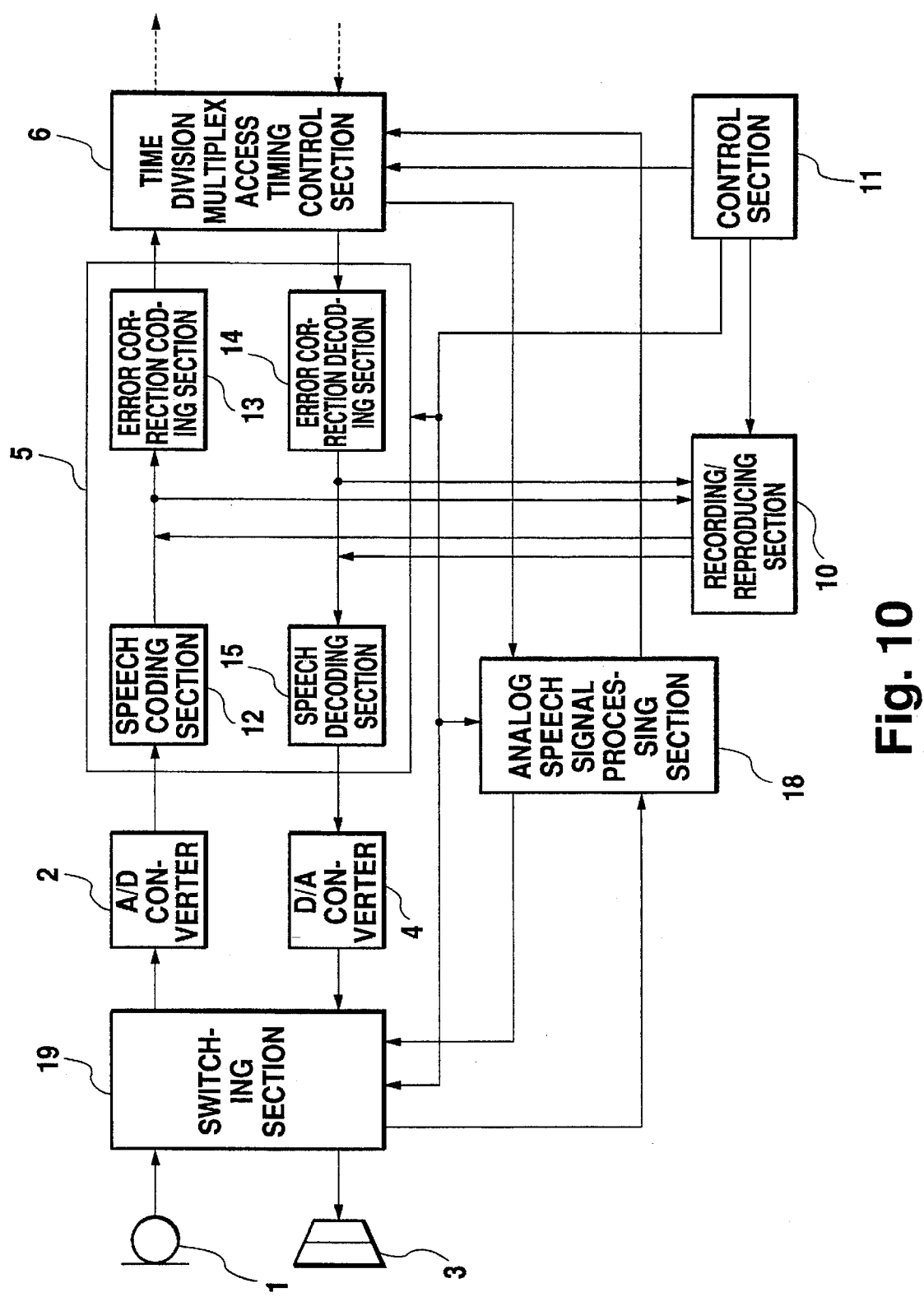
FIG. 10 is a block diagram showing a mobile communication apparatus in accordance with an eighth embodiment of the present invention.

With the configuration of the digital speech signal processing section 5 including the speech coding section 12, the error correction coding section 13, the error correction decoding section 14, and the speech decoding section 15 as in the sixth embodiment, the input and output of the compressed digital speech signals into and from the recording/ reproducing section 10 may be configured in such a manner shown in FIG. 10, as in the second embodiment. More specifically, the compressed digital speech data derived from the speech coding section 12 are recorded and the speech on the side of the local central office is recorded. Alternatively, there may be recorded the compressed digital speech data derived from the error correction decoding section 14, as well as the speech on the side of the other party in communication. The compressed digital speech data thus recorded are supplied into the error correction coding section 13 for reproduction on the side of the other party in communication, or alternatively, into the speech decoding section is for the reproduction on the side of the local central office.

Embodiment 9

Figure 11:
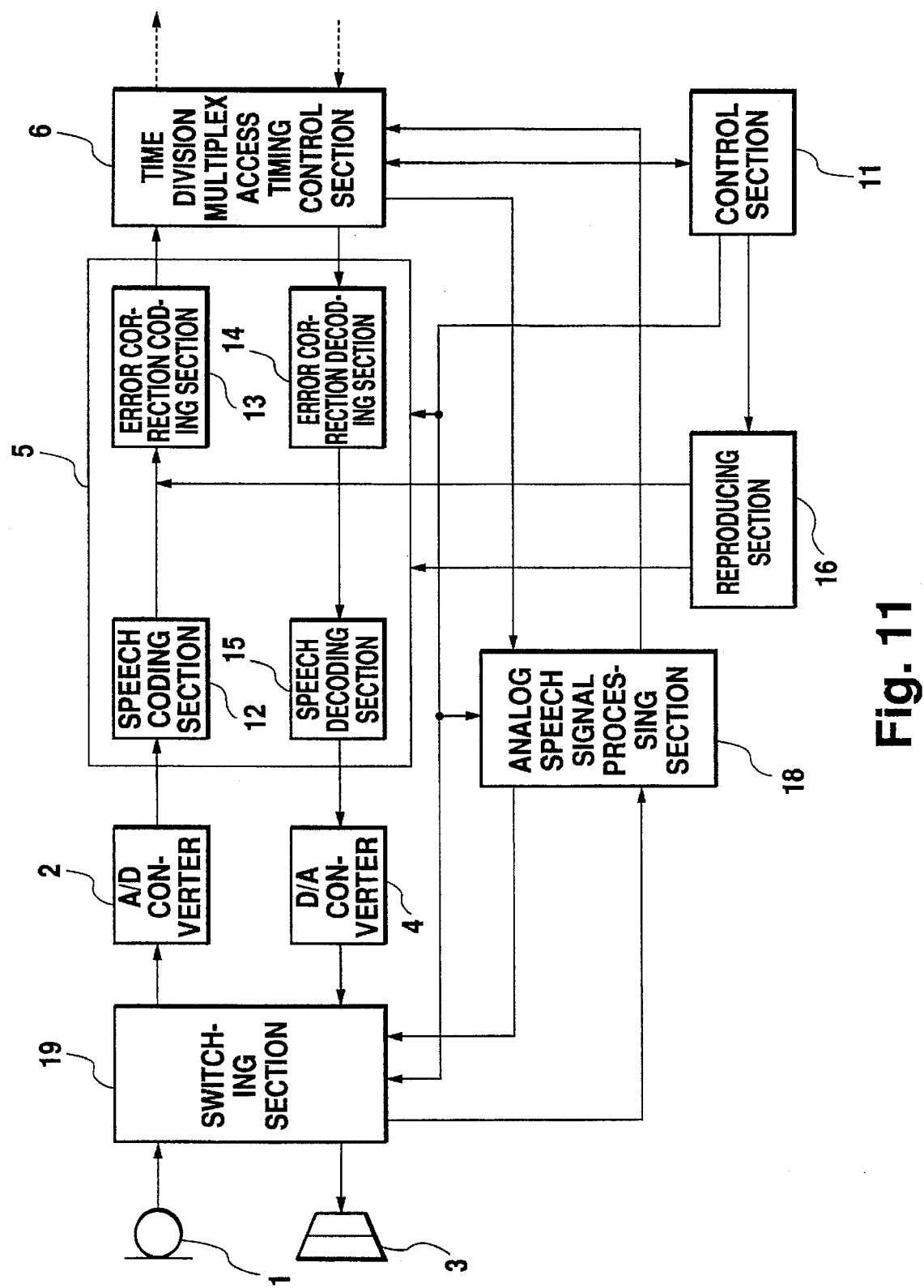
FIG. 11 is a block diagram showing a mobile communication apparatus in accordance with a ninth embodiment of the present invention.

The recording/reproducing section in the eighth embodiment may be substituted by the reproducing section 16 in the fifth embodiment. FIG. 11 depicts its configuration. The compressed digital speech data corresponding to the predetermined signal data arising from the reproducing section 16 are supplied into the error correction coding section 13 for reproduction on the side of the other party in communication, or alternatively, into the speech decoding section 15 for reproduction on the side of the local central office.

Figure 12:
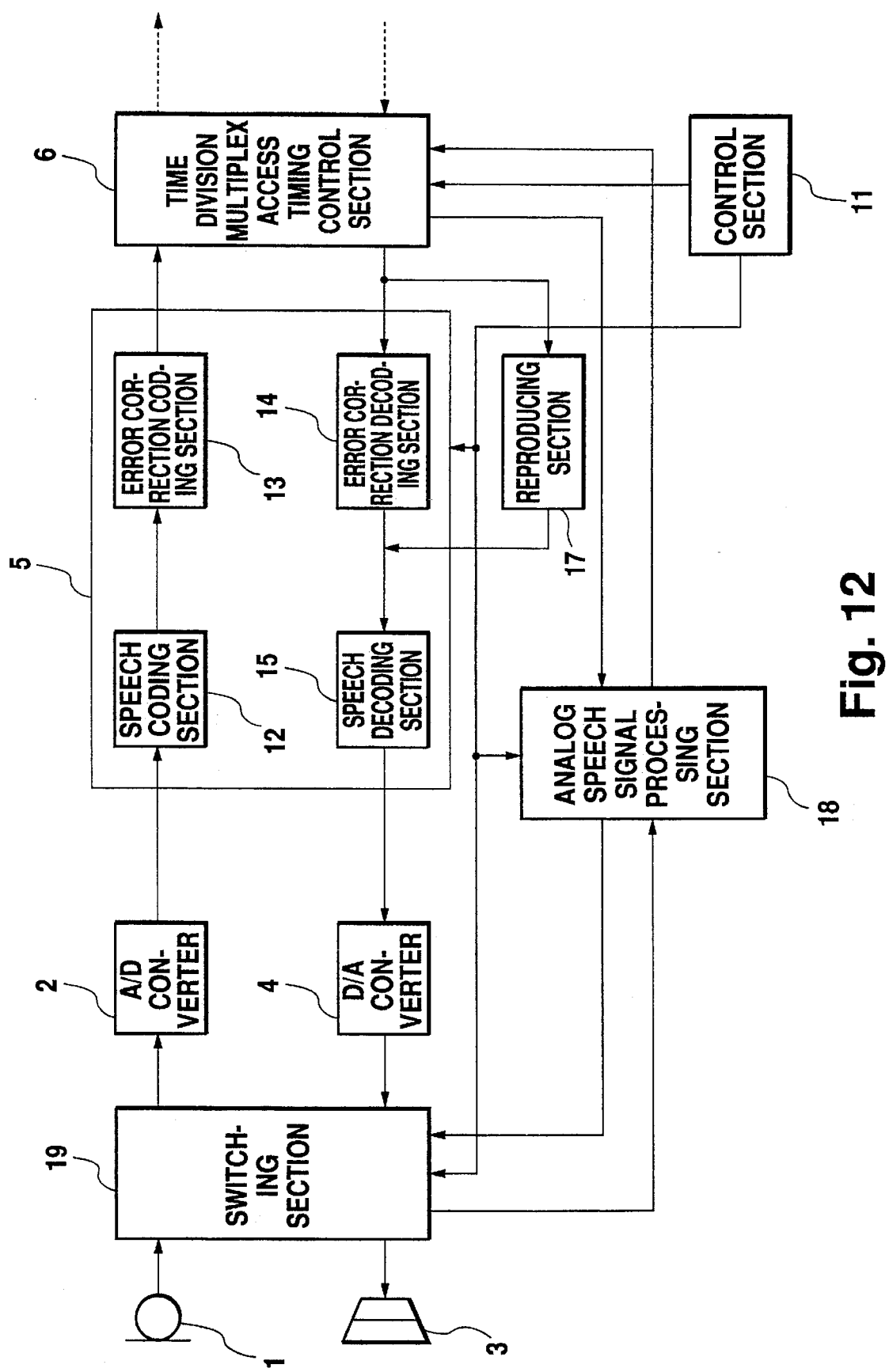
FIG. 12 is a block diagram showing a mobile communication apparatus in accordance with a ninth embodiment of the present invention, but differing from that shown in FIG. 11.

Similarly, there may be provided the reproducing section 17 in the fifth embodiment which reproduces the compressed digital speech data corresponding to the predetermined signal data transmitted from the other party in communication. FIG. 12 depicts its configuration. The compressed digital speech data to be reproduced are supplied into the voice decoding section 15.

Embodiment 10

Figure 13:
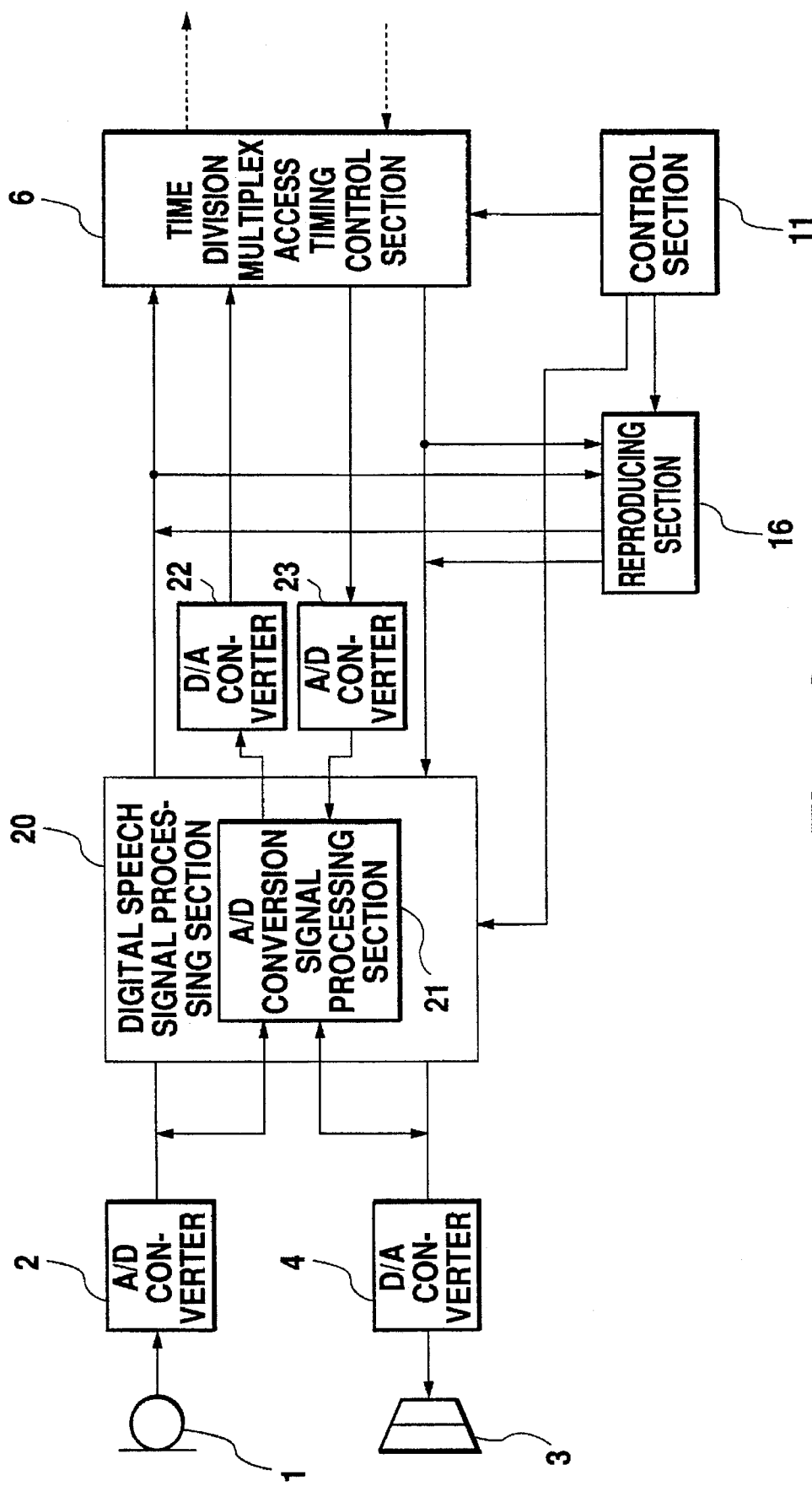
FIG. 13 is a block diagram showing a mobile communication apparatus in accordance with a tenth embodiment of the present invention.

FIG. 13 depicts a tenth embodiment of the present invention, which includes a recording/reproducing section into the mobile communication apparatus capable of both digital and analog communications. Reference numeral 20 denotes a digital speech signal processing section which performs a speech signal processing in both cases of digital communication mode and analog communication mode. Reference numeral 21 denotes an A/D conversion signal processing section which processes digital speech signals derived from the A/D converter 2 in the analog communication mode, and which is provided within the digital speech signal processing section 20. Reference numeral 22 denotes a D/A converter which converts into the analog speech signals the digital speech signals subjected to the signal processing in the A/D conversion signal processing section 21 in the analog communication mode. Reference numeral 23 denotes an A/D converter which converts into the digital speech signals the analog speech signals received from the time division multiplex access timing control section 6 in the analog communication mode.

The digital speech signal processing section 20 further comprises the A/D conversion signal processing section 21 besides the digital speech signal processing section 5 shown in the above embodiment. In the digital communication mode, an ordinary digital speech signal processing is carried out within the digital speech signal processing section 20 so that the resultant digital speech signals are transmitted and received by way of the time division multiplex access timing control section 6.

At the time of transmission, in the analog communication mode, the digital speech signals derived from the A/D converter 2 are supplied into the A/D conversion signal processing section 21 within the digital speech signal processing section 20, and are subjected to signal processing. This signal processing includes that the digital signals are subjected to an analog speech signal processing which is commonly carried out through, for example, a voice belt filtering upon the analog communication. The thus processed digital speech signals are converted into the analog speech signals by the D/A converter 22. The thus converted analog speech signals are the same as the ones to be subjected to the analog speech signal processing upon an ordinary transmission, and the resultant analog speech signals are transmitted. Upon the reception, the analog speech signals are converted into digital speech signals by the A/D converter 23, which is further provided In the A/D conversion signal processing section 21 for signal processing. The thus processed digital speech signals are converted into the analog speech signals by the D/A converter 4. In the same manner as above, the converted analog speech signals are the same as the ones subjected to the analog speech signal processing when ordinarily outputting the voice on the side of the local central office, which is supplied to the loudspeaker 3 for voice output.

The control section 11 determines which mode to be selected of the digital or analog communication, and based on the result, controls the digital speech signal processing section 20 to perform signal processing required in the digital communication mode and analog communication mode, respectively.

In the mobile communication apparatus for both digital and analog communications having the above configuration, as shown in FIG. 13, the speech signals to be recorded into and output from the recording/reproducing section 10 are the compressed digital speech data processed in the digital communication mode. When recording and reproducing in, especially, the analog communication mode, the digital speech signal processing section 20 is permitted to perform compression/ expansion processing which is originally to be carried out in the digital communication mode. The digital speech signals thus subjected to the compression processing may be recorded, or alternatively, the compressed digital speech data to be output may be expanded. The action of recording and reproducing is the same as in the sixth embodiment.

Embodiment 11

Figure 14:
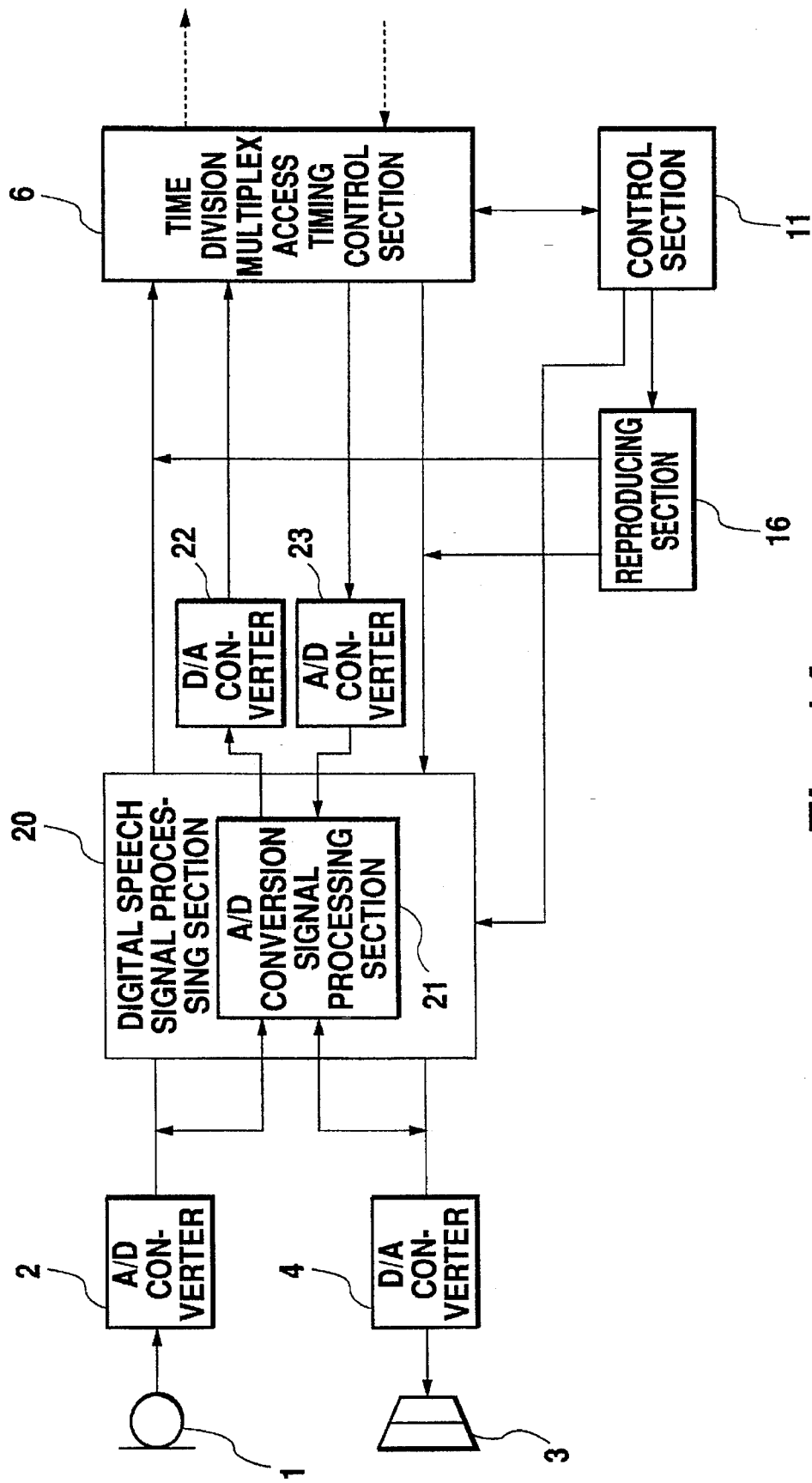
FIG. 14 is a block diagram showing a mobile communication apparatus in accordance with an eleventh embodiment of the present invention.

In the tenth embodiment, the recording/reproducing section 10 may be replaced with the reproducing section 16 in the third embodiment. FIG. 14 depicts its configuration.

Figure 15:
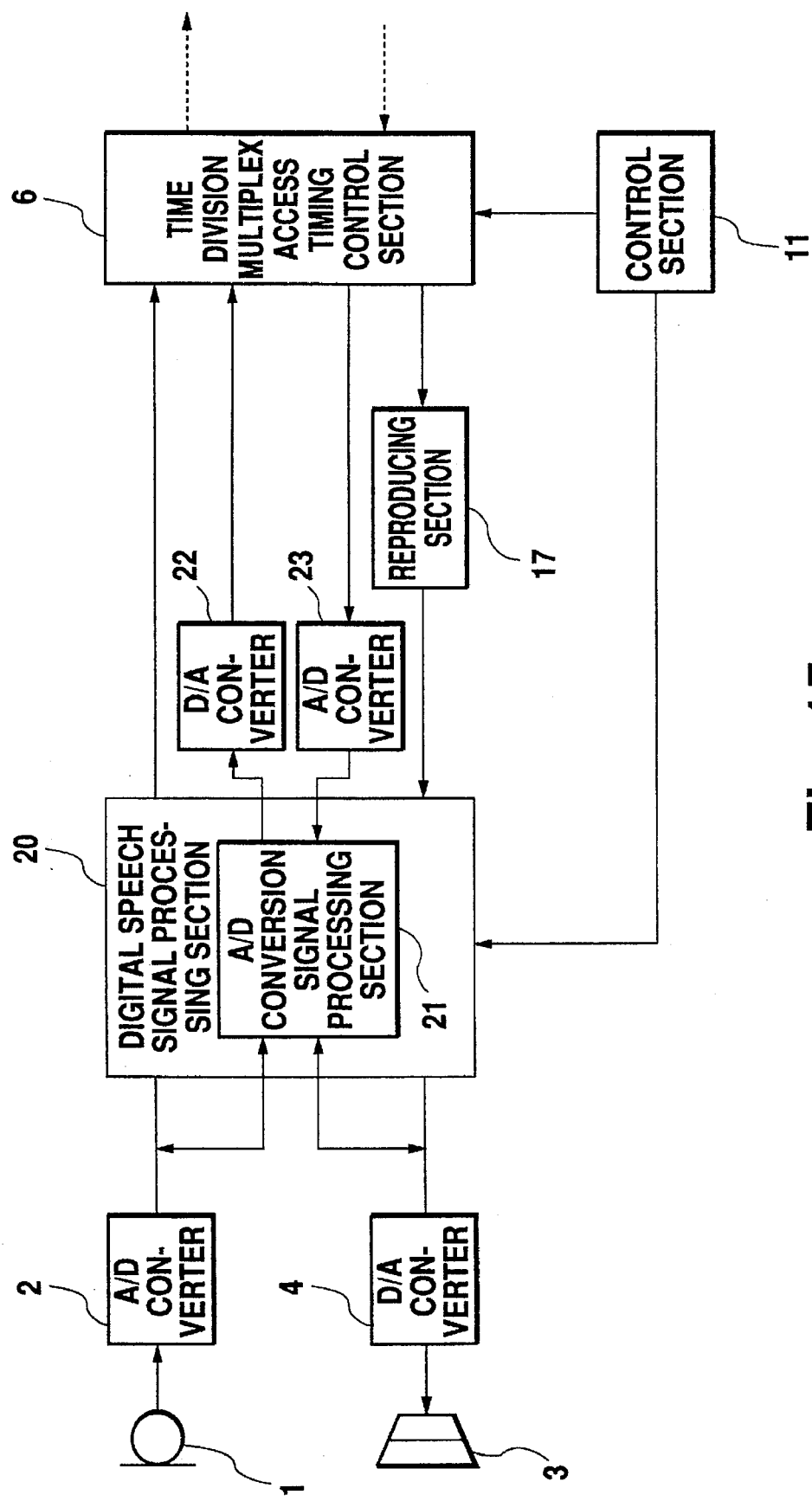
FIG. 15 is a block diagram showing a mobile communication apparatus in accordance with an eleventh embodiment of the present invention, but differing from that shown in FIG. 14.

Further, there may be provided the reproducing section 17 in the fourth embodiment. FIG. 15 depicts its configuration.

Embodiment 12

Figure 16:
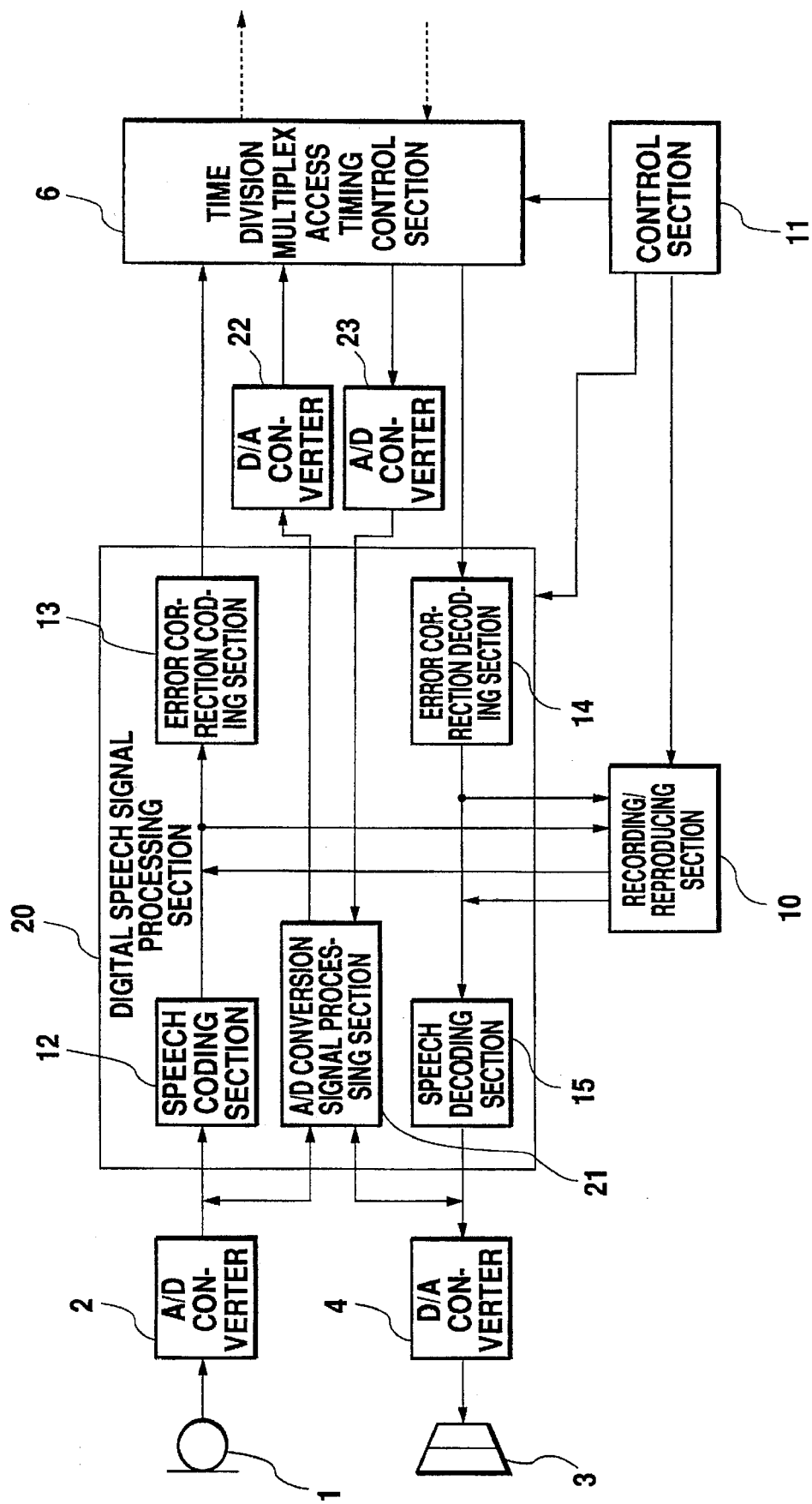
FIG. 16 is a block diagram showing a mobile communication apparatus in accordance with a twelfth embodiment of the present invention.

With the configuration of the digital speech signal processing section 20 in the eleventh embodiment including, as shown in FIG. 16, the speech coding section 12, the error correction coding section 13, the error correction decoding section 14, the speech decoding section 15, and the analog speech signal processing section 21, there may be configured the recording/reproducing section 10 as shown. In the same manner as in the second embodiment and the eighth embodiment, there are recorded the compressed digital speech data derived from the speech coding section 12 and the compressed digital speech data derived from the error correction decoding section 14. The thus recorded compressed digital speech data are supplied into the error correction coding section 13 for the reproduction on the side of the other party in communication, or alternatively, into the speech decoding section 15 for the reproduction on the side of the local central office.

Embodiment 13

Figure 17:
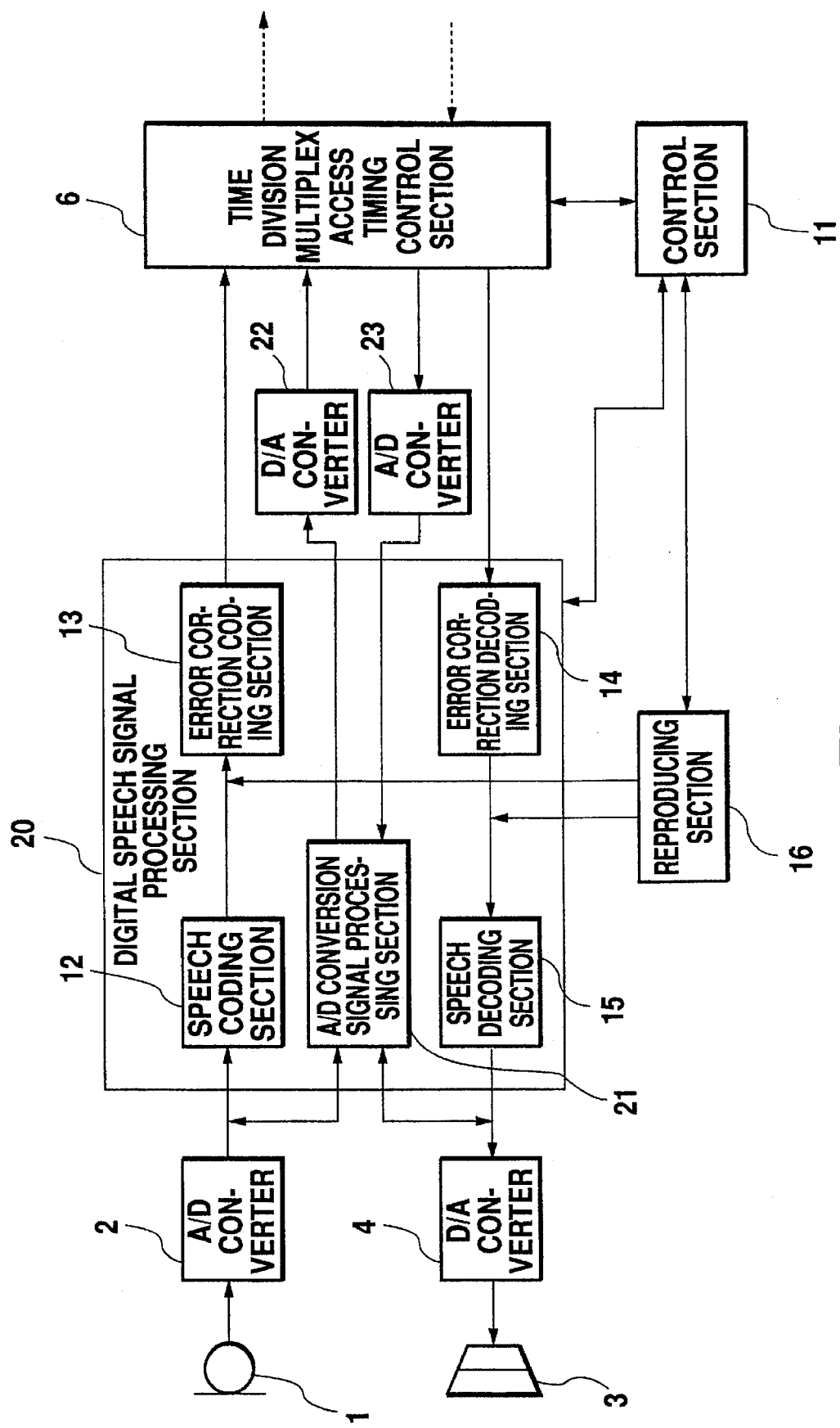
FIG. 17 is a block diagram showing a mobile communication apparatus in accordance with a thirteenth embodiment of the present invention.

In the twelfth embodiment, the recording/reproducing section 10 may be substituted by the reproducing section 16 in the fifth embodiment. FIG. 17 depicts its configuration.

Figure 18:
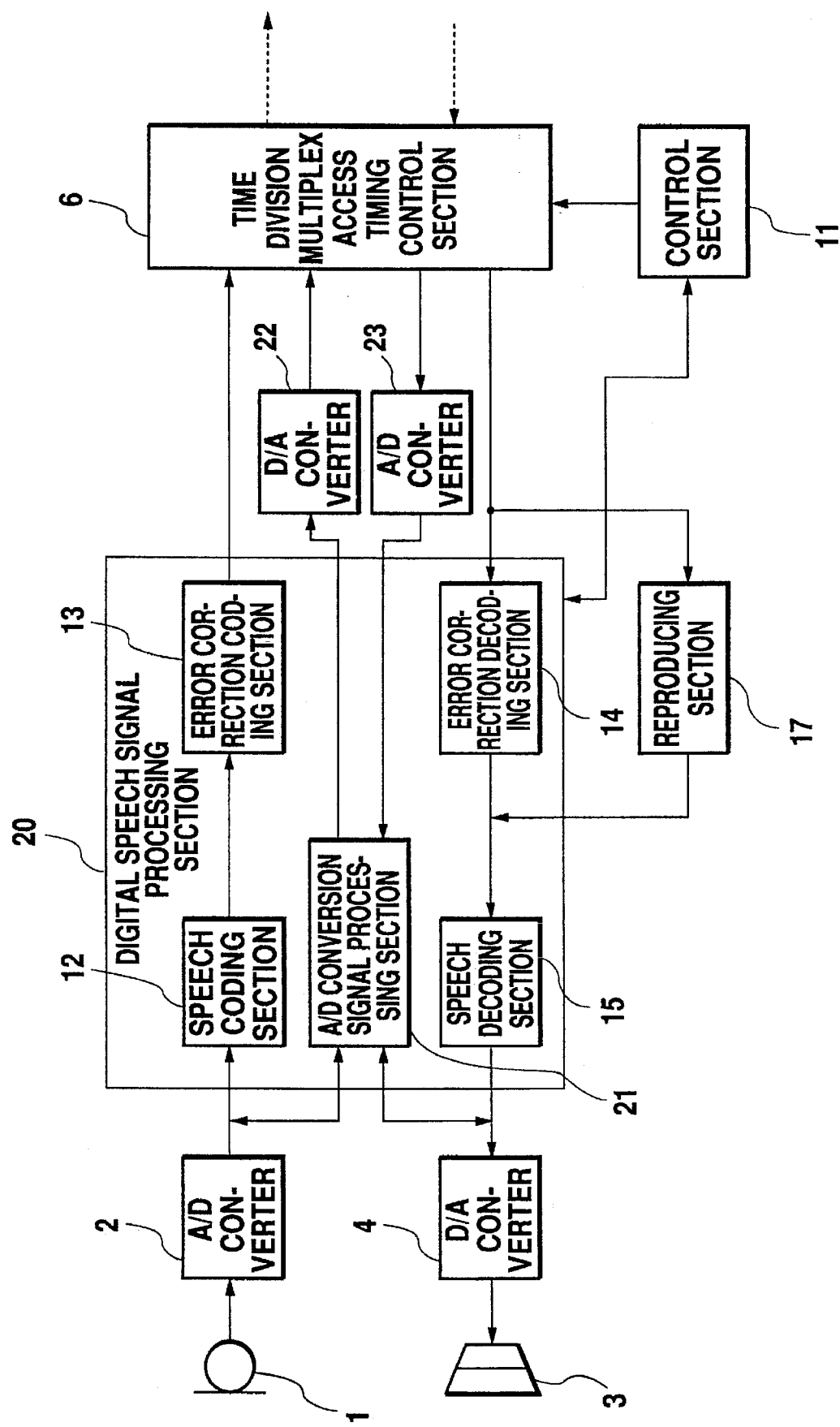
FIG. 18 is a block diagram showing a mobile communication apparatus in accordance with a thirteenth embodiment of the present invention, but differing from that shown in FIG. 17.

Further, there may be provided the reproducing section 17 in the fifth embodiment. FIG. 18 depicts its configuration.

What is claimed is:

1. A mobile communication apparatus having a recording/ reproducing function comprising:

(a) an A/D conversion means for converting analog speech signals into digital speech signals;

(b) a digital speech signal processing means for compressing said digital speech signals derived from said A/D conversion means and for expanding compressed digital speech data received from a base station;

(c) a D/A conversion means for converting said digital speech data expanded by said speech signal processing means into analog speech signals;

(d) a recording/reproducing means connected to said digital speech signal processing means for recording the digital speech signals compressed by said digital speech signal processing means or compressed digital speech data received from said base station and for reproducing thus recorded compressed digital speech data; and (e) a control means connected to said digital speech signal processing means and said recording/reproducing means for controlling the recording or the reproduction by said recording/reproducing means;

(f) an analog speech processing means for processing said analog speech signals; and (g) a switching means for selecting said analog speech processing means when transmitting and receiving said analog speech signals and for selecting said digital speech signal processing means when transmitting and receiving said digital speech data.

2. A mobile communication apparatus having a recording/ reproducing function according to claim 1, further comprising:

(h) an A/D conversion signal processing means lying within said digital speech signal processing means for performing signal processing for digital speech signals derived from said A/D conversion means; and (i) a second D/A conversion means connected to said A/D conversion processing means and for converting said digital speech signals processed by said A/D conversion signal processing means into analog signals;

when transmitting and receiving analog signals, said control means controlling said digital speech signal processing means to actuate said A/D conversion signal processing means.

3. A mobile communication apparatus having a recording/reproducing function, comprising:

(a) an A/D conversion means for converting analog speech signal into digital speech signals;

(b) a digital speech signal processing means including a speech coding section for compressing digital speech signals derived from said A/D conversion means, an error correction coding section for conferring error correction codes on the digital speech signals compressed by said speech coding section, an error correction decoding section for performing error correction processing for the compressed digital speech data based on said error codes imparted to said compressed digital speech data received from said base station, and a speech decoding section for expanding said compressed digital speech data derived from said error correction decoding section;

(c) a D/A conversion means for converting said digital speech signals derived from said speech decoding section into analog speech signals;

(d) a recording/reproducing means connected between said speech coding section and said error correction section and between said error correction decoding section and said speech decoding section for recording compressed digital speech data derived from said speech coding section and said error correction decoding section and for supplying thus recorded compressed digital signals into said speech decoding section or said error correction decoding section; and (e) a control means connected to said digital speech signal processing means and said recording/reproducing means for controlling the recording and reproducing in said recording/reproducing means.

4. A mobile communication apparatus having a recording/reproducing function according to claim 3, further comprising:

(f) an analog speech processing means for processing said analog speech signals; and (g) a switching means for selecting said analog speech processing means when transmitting and receiving said analog speech signals, and for selecting said digital speech signal processing means when transmitting and receiving said digital speech signals.

5. A mobile communication apparatus having a recording/reproducing function according to claim 3, further comprising:

(f) an A/D conversion signal processing means located within said digital speech processing means, for performing signal processing for the digital speech signals derived from said A/D conversion means; and (g) a second D/A conversion means connected to said A/D conversion signal processing means for converting the digital speech signals processed by said A/D conversion signal processing means;

when transmitting and receiving said analog signals, said control means controlling said digital speech signal processing means to actuate said A/D conversion signal processing means.

6. A mobile communication apparatus having a reproducing function comprising:

(a) an A/D conversion means for converting analog speech signals into digital speech signals;

(b) a digital speech signal processing means for compressing said digital speech signals derived from said A/D conversion means and for expanding compressed digital speech data received from a base station;

(c) a D/A conversion means for converting said digital speech signals expanded by said speech signal processing means into analog speech signals;

(d) a reproducing means connected to said digital speech signal processing means for reproducing compressed digital speech data having a pattern corresponding to input predetermined signal data, and for outputting them to said digital speech signal processing means or said base station;

(e) a control means connected to said digital speech signal processing means and said reproducing means for controlling the reproduction by said reproducing means;

(f) an analog speech processing means for processing said analog speech signals; and (g) a switching means for selecting said analog speech processing means when transmitting and receiving said analog speech signals and for selecting said digital speech signal processing means when transmitting and receiving said digital speech signals.

7. A mobile communication apparatus having a recording/reproducing function according to claim 6, further comprising:

(f) an A/D conversion signal processing means lying within said digital speech signal processing means, and intended to perform signal processing for digital speech signals derived from said A/D conversion means; and (g) a second D/A conversion means connected to said A/D conversion processing means and intended to convert said digital speech signals processed by said A/D conversion signal processing means into analog signals;

when transmitting and receiving analog signals, said control means controlling said digital speech signal processing means to actuate said A/D conversion signal processing means.

8. A mobile communication apparatus having a reproducing function, comprising:

(a) an A/D conversion means for converting analog speech signal into digital speech signals;

(b) a digital speech signal processing means including a speech coding section for compressing digital speech signals derived from said A/D conversion means, an error correction coding section for conferring error correction codes on the digital speech signals compressed by said speech coding section, an error correction decoding section for performing error correction processing for the compressed digital speech data based on said error codes imparted to said compressed digital speech data received from said base station, and a speech decoding section for expanding said compressed digital speech data derived from said error correction decoding section;

(c) a D/A conversion means for converting said digital speech signals derived from said speech decoding section into analog speech signals;

(d) a reproducing means connected between said speech coding section and said error correction section and between said error correction decoding section and said speech decoding section for reproducing compressed digital speech signals having a pattern corresponding to input predetermined signal data and for outputting them to said error correction coding section or said speech decoding section; and (e) a control means connected to said digital speech signal processing means and said recording/reproducing means for controlling the recording and reproducing in said recording/reproducing means.

9. A mobile communication apparatus having a reproducing function according to claim 8, further comprising:

(f) an analog speech processing means for processing said analog speech signals; and (g) a switching means for selecting said analog speech processing means when transmitting and receiving said analog speech signals, and for selecting said digital speech signal processing means when transmitting and receiving said digital speech signals.

10. A mobile communication apparatus having a recording/reproducing function according to claim 8, further comprising:

(f) an A/D conversion signal processing means located within said digital speech processing means for performing signal processing for the digital speech signals derived from said A/D conversion means; and (g) a second D/A conversion means connected to said A/D conversion signal processing means for converting the digital speech signals processed by said A/D conversion signal processing means;

whereby when transmitting and receiving said analog signals, said control means controls said digital speech signal processing means to actuate said A/D conversion signal processing means.

11. A mobile communication apparatus having a reproducing function comprising:

(a) an A/D conversion means for converting analog speech signals into digital speech signals;

(b) a digital speech signal processing means for compressing said digital speech signals derived from said A/D conversion means and for expanding compressed digital, speech data received from a base station;

(c) a D/A conversion means for converting said digital speech signals expanded by said speech signal processing means into analog speech signals; and (d) a reproducing means connected to said digital speech signal processing means for reproducing compressed digital speech data having a pattern corresponding to predetermined signal data received from a base station, and for outputting them to said digital speech signal processing means or said base station;

(e) an analog speech processing means for processing said analog speech signals; and (f) a switching means for selecting said analog speech processing means when transmitting and receiving said analog speech signals and for selecting said digital speech signal processing means when transmitting and receiving said digital speech signals.

12. A mobile communication apparatus having a reproducing function according to claim 11, further comprising:

(e) an A/D conversion signal processing means lying within said digital speech signal processing means, and intended to perform signal processing for digital speech signals derived from said A/D conversion means;

(f) a second D/A conversion means connected to said A/D conversion processing means and intended to convert said digital speech signals processed by said A/D conversion signal processing means into analog signals; and (g) a control means connected to said speech decoding section and intended to control said digital speech signal processing means to actuate said A/D conversion processing means when transmitting and receiving analog signals.

13. A mobile communication apparatus having a reproducing function, comprising:

(a) an A/D conversion means for converting analog speech signal into digital speech signals;

(b) a digital speech signal processing means including a speech coding section for compressing digital speech signals derived from said A/D conversion means, an error correction coding section for conferring error correction codes on the digital speech data compressed by said speech coding section, an error correction decoding section for performing error correction processing for the compressed digital speech data based on said error codes imparted to said compressed digital speech data received from said base station, and a speech decoding section for expanding said compressed digital speech data derived from said error correction decoding section;

(c) a D/A conversion means for converting said digital speech signals derived from said speech decoding section into analog speech signals; and (d) a reproducing means connected between said speech coding section and said error correction section and between said error correction decoding section and said speech decoding section for reproducing compressed digital speech data having a pattern corresponding to predetermined signal data received from a base station and to output them to said error correction coding section or said speech decoding section.

14. A mobile communication apparatus having a reproducing function according to claim 13, further comprising:

(e) an analog speech processing means for processing said analog speech signals; and (f) a switching means for selecting said analog speech processing means when transmitting and receiving said analog speech signals, and for selecting said digital speech signal processing means when transmitting and receiving said digital speech signals.

15. A mobile communication apparatus having a reproducing function according to claim 13, further comprising:

(e) an A/D conversion signal processing means located within said digital speech processing means, and intended to perform signal processing for the digital speech signals derived from said A/D conversion means;

(f) a second D/A conversion means connected to said A/D conversion signal processing means for converting the digital speech signals processed by said A/D conversion signal processing means;

(g) a control means connected to said digital speech processing means for controlling said digital speech signal processing means to actuate said A/D conversion signal processing means when transmitting and receiving analog signals.

* * * * *

UNITED STATES PATENT AND TRADEMARK OFFICE
CERTIFICATE OF CORRECTION

PATENT NO. : 5,632,001
DATED : May 20, 1997
INVENTOR(S) : Tohru Terauchi

It is certified that error appears in the above-indentified patent and that said Letters Patent is hereby corrected as shown below:

Col. 1, line 10, "Related Arts" should be -- Prior Art --; Col. 1, line 14, "FIG. 1" should be -- FIG. 19 --; Col. 2, line 65, delete "a".

Signed and Sealed this

Twenty-first Day of March, 2000

Attest:

Attesting Officer

Q. TODD DICKINSON

Commissioner of Patents and Trademarks